United States Patent
Shpurov et al.

(10) Patent No.: US 12,512,960 B2
(45) Date of Patent: *Dec. 30, 2025

(54) HOMOMORPHIC COMPUTATIONS ON ENCRYPTED DATA WITHIN A DISTRIBUTED COMPUTING ENVIRONMENT

(71) Applicant: The Toronto-Dominion Bank, Toronto (CA)

(72) Inventors: Alexey Shpurov, Toronto (CA); Lovell Hodge, Burlington (CA); Brian Andrew Lam, Toronto (CA); Leslie Carol Thomas, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/940,847

(22) Filed: Sep. 8, 2022

(65) Prior Publication Data
US 2023/0006809 A1 Jan. 5, 2023

Related U.S. Application Data

(63) Continuation of application No. 16/751,792, filed on Jan. 24, 2020, now Pat. No. 11,469,878.

(Continued)

(51) Int. Cl.
*H04L 9/00* (2022.01)
*G06F 21/60* (2013.01)
(Continued)

(52) U.S. Cl.
CPC ............ *H04L 9/008* (2013.01); *G06F 21/602* (2013.01); *G06N 20/00* (2019.01); *H04L 9/0618* (2013.01);
(Continued)

(58) Field of Classification Search
CPC ......... H04L 9/008; H04L 9/0618; H04L 9/30; H04L 9/3218; H04L 63/0428; G06N 20/00; G06F 21/602
(Continued)

(56) References Cited

U.S. PATENT DOCUMENTS 11,605,013 B2 * 3/2023 Manamohan ......... H04L 9/3239
11,936,631 B2 * 3/2024 Pelage ..................... G06F 8/65
(Continued)

FOREIGN PATENT DOCUMENTS

CA      3 002 582 C    10/2017

OTHER PUBLICATIONS

Hiscock et al., 2018 IEEE, 21st Euromicro Conference on Digital System Design "On the Design of a Processor Working Over Encrypted Data", pp. 577-580 (Year: 2018).*

(Continued)

*Primary Examiner* — Khalil Naghdali
(74) *Attorney, Agent, or Firm* — Nixon Peabody LLP

(57) ABSTRACT

The disclosed exemplary embodiments include computer-implemented systems, apparatuses, and processes that perform homomorphic computations on encrypted third-party data within a distributed computing environment. For example, an apparatus receives a homomorphic public key and encrypted transaction data characterizing an exchange of data from a computing system, and encrypts modelling data associated with a first predictive model, such as a machine learning model or an artificial neural network model, using the homomorphic public key. The apparatus may perform homomorphic computations that apply the first predictive model to the encrypted transaction data in accordance with the encrypted first modelling data, and transmit an encrypted first output of the homomorphic computations to the computing system, which may decrypt the encrypted (Continued)

first output using a homomorphic private key and generate decrypted output data indicative of a predicted likelihood that the data exchange represents fraudulent activity.

21 Claims, 6 Drawing Sheets

Related U.S. Application Data

(60) Provisional application No. 62/797,665, filed on Jan. 28, 2019.

(51) Int. Cl.
  *G06N 20/00* (2019.01)
  *H04L 9/06* (2006.01)
  *H04L 9/30* (2006.01)
  *H04L 9/32* (2006.01)
  *H04L 9/40* (2022.01)

(52) U.S. Cl.
  CPC .............. *H04L 9/30* (2013.01); *H04L 9/3218* (2013.01); *H04L 63/0428* (2013.01)

(58) Field of Classification Search
  USPC .......................................................... 713/171
  See application file for complete search history.

(56) References Cited

U.S. PATENT DOCUMENTS

| | | |
|---|---|---|
| 2005/0091524 A1 | 4/2005 | Abe et al. |
| 2015/0262185 A1 | 9/2015 | Abe et al. |
| 2016/0071017 A1* | 3/2016 | Adjaoute ........... G06Q 20/4016 706/52 |
| 2017/0357749 A1 | 12/2017 | Laine et al. |
| 2018/0137272 A1 | 5/2018 | Kamal |
| 2018/0293377 A1 | 10/2018 | Tomonaga |
| 2018/0349740 A1* | 12/2018 | Schneider ............... G06F 17/18 |
| 2018/0359084 A1* | 12/2018 | Jain ........................... H04L 9/08 |
| 2019/0036678 A1 | 1/2019 | Ahmed |
| 2019/0182216 A1 | 6/2019 | Gulak et al. |
| 2019/0288850 A1 | 9/2019 | Beecham et al. |
| 2019/0296910 A1 | 9/2019 | Cheung |
| 2020/0007331 A1* | 1/2020 | Wentz .................... H04L 9/006 |

OTHER PUBLICATIONS

Fischer et al., Arxiv, Oct. 2017 "Computation on Encrypted Data using Data Flow Authentication" (Year: 2017).*

* cited by examiner

HOMOMORPHIC COMPUTATIONS ON ENCRYPTED DATA WITHIN A DISTRIBUTED COMPUTING ENVIRONMENT

CROSS-REFERENCE TO RELATED APPLICATION

This application is a continuation of, and claims the benefit of priority to, U.S. application Ser. No. 16/751,792, filed Jan. 24, 2020, the disclosure of which is expressly incorporated herein by reference to its entirety.

TECHNICAL FIELD

The disclosed embodiments generally relate to computer-implemented systems and processes that, among other things, perform homomorphic computations on encrypted confidential data within a distributed computing environment.

BACKGROUND

Today, many institutions maintain confidential data characterizing various interactions with their customers. The confidential data may, for example, include elements of transaction data that characterize transactions involving one or more accounts held by the customers and identify instances of fraudulent activity associated with certain ones of these transactions. Given the scope of the maintained data, these institutions can develop and train predictive fraud models that, when applied to selected elements of input data, generate output data characterizing a likelihood that a particular transaction represents fraudulent activity.

SUMMARY

In some examples, an apparatus includes a communications interface, a memory storing instructions, and at least one processor coupled to the communications interface and the memory. The at least one processor is configured to execute the instructions to receive, via the communications interface, a first signal from a computing system that includes a homomorphic public key and encrypted transaction data characterizing an exchange of data, and to encrypt first modelling data associated with a first predictive model using the homomorphic public key. The at least one processor is further configured to perform homomorphic computations on the encrypted transaction data, and the homomorphic computations apply the first predictive model to the encrypted transaction data in accordance with the encrypted first modelling data. The at least one processor is further configured to generate and transmit, via the communications interface, a second signal to the computing system that includes an encrypted first output of the homomorphic computations. The computing system is configured to decrypt the encrypted first output using a homomorphic private key and generate decrypted output data indicative of a predicted likelihood that the data exchange represents fraudulent activity.

In other examples, a computer-implemented method includes receiving, by at least one processor, a first signal from a computing system that includes a homomorphic public key and encrypted transaction data characterizing an exchange of data and by the at least one processor, encrypting first modelling data associated with a first predictive model using the homomorphic public key. The computer-implemented method also includes, by the at least one processor, performing homomorphic computations on the encrypted transaction data. The homomorphic computations apply the first predictive model to the encrypted transaction data in accordance with the encrypted first modelling data. The computer-implemented method also includes generating and transmitting, by the at least one processor, a second signal to the computing system that includes an encrypted first output of the homomorphic computations. The computing system is configured to decrypt the encrypted first output using a homomorphic private key and generate decrypted output data indicative of a predicted likelihood that the data exchange represents fraudulent activity.

Additionally, in some instances, a tangible, non-transitory computer-readable medium stores instructions that, when executed by at least one processor, cause the at least one processor to perform a method that includes receiving a first signal from a computing system that includes a homomorphic public key and encrypted transaction data characterizing an exchange of data. The method also includes encrypting first modelling data associated with a first predictive model using the homomorphic public key, and performing homomorphic computations on the encrypted transaction data. The homomorphic computations apply the first predictive model to the encrypted transaction data in accordance with the encrypted first modelling data. The method also includes generating and transmitting a second signal to the computing system that includes an encrypted first output of the homomorphic computations. The computing system is configured to decrypt the encrypted first output using a homomorphic private key and generate decrypted output data indicative of a predicted likelihood that the data exchange represents fraudulent activity.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Figure 1:
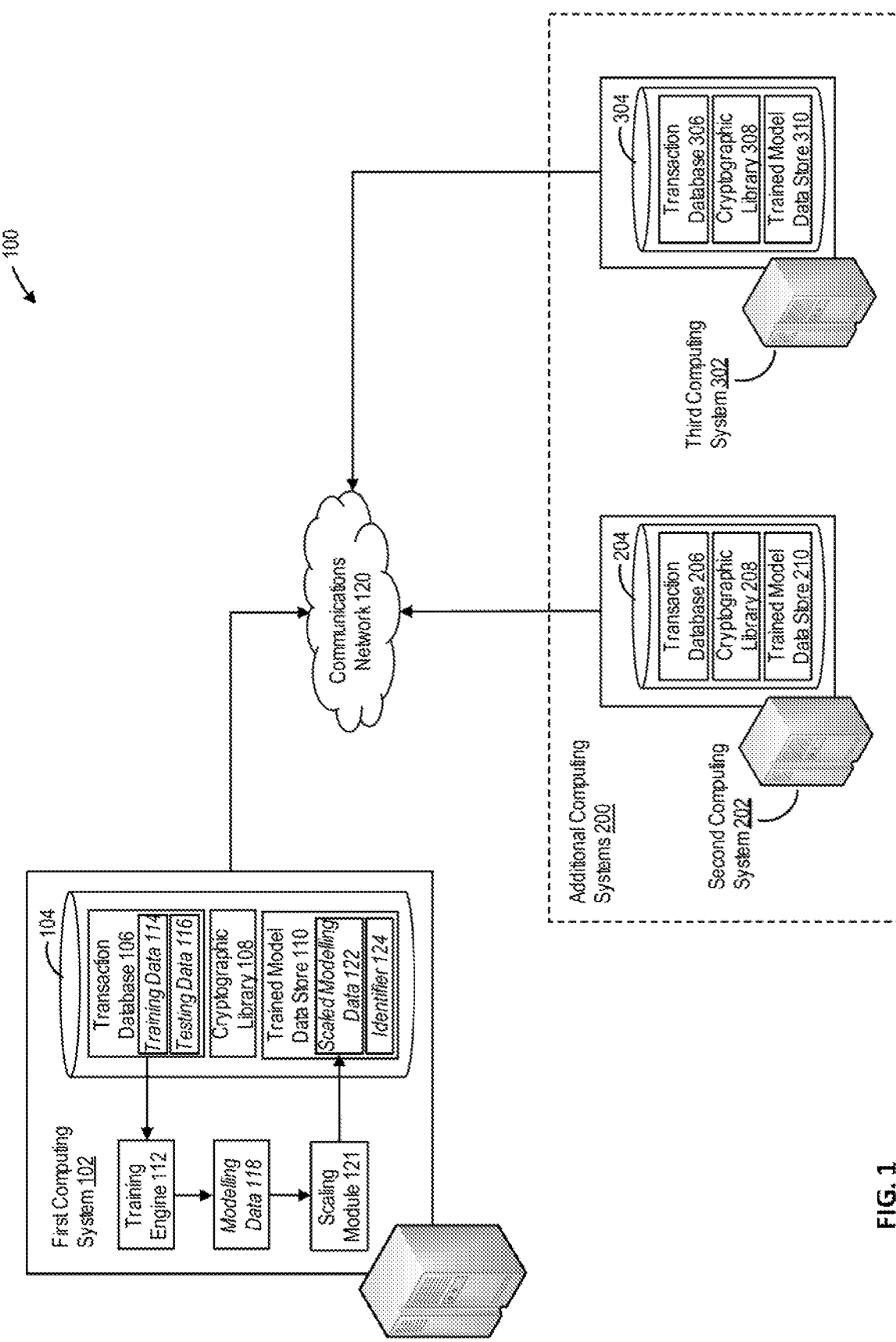
FIGS. 1, 2A, 2B, 3A, and 3B are diagrams illustrating portions of an exemplary computing environment, consistent with disclosed embodiments.

Many institutions, organizations, and business capture and maintain confidential data characterizing interactions with various customers, stakeholders, or interested parties. By way of example, a financial institution may issue payment instruments, such as credit card accounts or debit card accounts, to various customers, and computing systems operated by these financial institutions may receive and maintain elements of confidential transaction data that establish a time-evolving record of transactions involving these payment instruments. For instance, the elements of confidential transaction data may specify, for a corresponding one of the transactions, not only values of certain transaction parameters (e.g., a transaction value or a transaction time) but also counterparty data that identifies one or more counterparties and positional information characterizing a geographical position associated with the corresponding transaction (e.g., a geographic position of an initiating device, a point-of-sale device, etc.).

Further, the elements of confidential transaction data may also identify instances of fraudulent activity involving corresponding ones of the transactions. For example, the instances of fraudulent activity include an unauthorized use of a payment instrument in a corresponding purchase transaction (e.g., through a loss or theft of a physical payment card, etc.), and the elements of transaction data may correlate each instance of fraudulent activity with a corresponding one of the payment instruments and with the parameter values, counterparty data, and positional data that characterize the corresponding purchase transaction. In other examples, the transaction data elements may also include information that associates a particular counterparty to one or more of the transactions with fraudulent activity (e.g., that associates a particular physical retailer with reported instances of fraudulent activity), or that associates a particular geographic region with a heightened risk of fraudulent activity.

In view of the confidential transaction data available to the financial institutions, the computing systems associated with one or more these financial institutions may leverage portions of the maintained transaction data to adaptively train and improve predictive fraud models that, when applied to selected elements of structured input transaction data, generate output data characterizing a likelihood that a particular transaction or exchange of data represents an instance of fraudulent activity. Examples of these predictive fraud models may include, but are not limited to, or more regression models characterized by derived model coefficients, tuned parameters, and/or threshold values (such as, but not limited to a LASSO model or a ridge regression), one or more artificial neural network models, and one or more machine learning models (such as, but not limited to, a logistic regression model or certain decision tree models. Further, the output of these predictive fraud models may be binary, e.g., unity or zero, or a scaled value compared against a specified threshold value, e.g., selected to distinguish between fraudulent or acceptable activities.

In some instances, each of the financial institutions are subject to certain restrictions imposed by governmental entities, regulatory entities, or industry groups, which mandate these financial institutions not only maintain the security and confidentiality of the maintained transaction data, but also obtain customer consent to a distribution of the confidential transaction data, either within the financial institutions or to unrelated, third-party financial institutions or organizations. Additionally, as the exemplary predictive fraud models described herein are trained against, and adaptively improved using, elements of the confidential transaction data, and as the model coefficients, parameters, and thresholds are derived on the basis of selected portions of the confidential transaction data, certain of the imposed restrictions may also mandate that the financial institutions maintain a security and confidentiality of the derived model coefficients, parameters, and thresholds.

For example, an unauthorized (or accidental) disclosure of the derived model coefficients, parameters, and/or thresholds by one or more of the financial institutions could enable an unrelated third party, such as another financial institution, a malicious third party, etc., to back-compute the values of the model coefficients, parameters, and thresholds, and portions of the confidential transaction data, based on repetitive computation. Thus, and in additional to maintaining a strict confidentiality of the transaction data elements, each of these financial institutions, and corresponding ones of the computing systems operated by the financial institutions, may implement policies that maintain a confidentiality of the derived model coefficients, parameters, and thresholds, and that exclude any application of these adaptively trained models to third-party transaction data collected by unrelated financial institutions.

In other instances, however, one or more of the financial institutions may benefit from an ability to access a predictive fraud model privately trained and by a computing system operated by another, unrelated financial institution, and to apply the privately trained predictive fraud models to locally accessible elements of confidential transaction data, e.g., to characterize a likelihood that one or more transactions represent fraudulent or illicit activity. For example, the computing systems operated by one or more of these financial institutions may privately train, and adaptively improve, a predictive fraud model based on sets of training data that characterize transactions involving groups of demographically or geographically different customers. When applied to input transaction data associated with a pending or initiated transaction, each of these predictive fraud models may generate a distinct element of output data representative of a likelihood that the pending or initiated transaction is associated with fraudulent or illicit activity, e.g., in accordance with the transaction behavior of a corresponding group of the demographically or geographically different customers Certain of the exemplary processes described herein, which implement predictive fraud models in conjunction with homomorphic encryption schemes that facilitate verifiable computations on encrypted data, enable a computing system associated with a financial institution to apply a privately trained predictive fraud model to encrypted elements of confidential, third-party transaction data. By way of example, and as described herein, the computing system may receive a third-party public key and the third-party transaction data encrypted using a corresponding third-party private key, e.g., from a third-party computing system. The computing system may encrypt the model coefficients, parameters, or thresholds using the third-party public key, and based on an application of the predictive fraud model to the encrypted third-party transaction data using verifiable homomorphic computations, may generate encrypted output data for transmission to the third-party computing system, which may decrypt the encrypted output data (e.g., using the corresponding private key) and generate output data indicative of the likelihood of fraudulent activity.

In some exemplary embodiments, described herein, the homomorphic computations involving the encrypted third-party transaction data maintain the confidentiality of the privately trained model, as the underlying model coefficients, parameters, or thresholds are encrypted using the third-party public key. Further, certain of these exemplary processes, as described herein, allow the third-party financial institution to maintain the confidentiality of not only the third-party transaction data provided to the computing system, but also the output generated by the predictive fraud model, e.g., as the input and output data are encrypted using the third-party public cryptographic key. Moreover, by generating not only encrypted output data based on the application of the predictive fraud model (and the encrypted model coefficients, parameters, or models) to the encrypted input data, but also a zero-knowledge proof of the encrypted output data, the third-party computing system may perform operations that independently verify an accuracy of the computation based on the underlying input data and the zero-knowledge proof.

FIG. 1 illustrates components of an exemplary computing environment 100, which perform computerized processes that establish one or more predictive fraud models capable of performing verifiable, homomorphic computations on encrypted input data, and that privately train one or more established predictive fraud models using locally accessible elements of confidential data, in accordance with some exemplary implementations. For example, and referring to FIG. 1, environment 100 includes a first computing system 102 and one or more additional computing systems 200, including a second computing system 202 and a third computing system 302, each of which may be interconnected through one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

As described herein, each of first computing system 102 and additional computing systems 200, including second computing system 202 and third computing system 302, may correspond to a computing system that includes one or more servers and tangible, non-transitory memory devices storing executable code and application modules. The one or more servers may each include one or more processors, which may be configured to execute portions of the stored code or application modules to perform operations consistent with the disclosed embodiments. Further, in some instances, first computing system 102 or one or more of additional computing systems 200 (including second computing system 202 and third computing system 302) can be incorporated into a single computing system, although in other instances, one or more of first computing system 102 or additional computing systems 200 (including second computing system 202 and third computing system 302) can correspond to a distributed system that includes computing components distributed across communications network 120, such as those described herein, or those provided or maintained by cloud-service providers (e.g., Google Cloud™, Microsoft Azure™, etc.). The disclosed embodiments are, however, not limited to these exemplary distributed systems, and in other instances, first computing system 102 and additional computing systems 200, including second computing system 202 and third computing system 302, may include computing components disposed within any additional or alternate number or type of computing systems or across any appropriate network.

In some instances, each of first computing system 102 and second computing system 202 may be associated with, or operated by, a financial institution or other business entity that provides financial services to one or more customers (e.g., respective ones of a first financial institution and a second financial institution). Further, one or more of additional computing systems 200 may also be associated with, or operated by, an additional financial institution that provides financial services to one or more additional customers. Examples of the provisioned financial services may include, but are not limited to, establishing and maintaining financial services accounts on behalf of corresponding customers (e.g., a deposit account, a brokerage account, a credit card account or a revolving line of credit, etc.) and/or initiating payment transactions involving corresponding ones of the financial services accounts and counterparties.

Further, third computing system 302 may be associated with, or operated by, a centralized authority, such as, but not limited to, an industry group, industry consortium, or other provider of financial services having affiliates or members. In some instances, as described herein, the centralized authority, and third computing system 302, may be trusted by the first financial institution, the second financial institution, and additional financial institutions to apply privately trained predictive fraud models to encrypted transaction data based on locally maintained model coefficients, model parameters, and threshold values. In other instances, third computing system 302 may be associated with a third financial institution that provides any of the exemplary financial services described herein to corresponding customers.

To facilitate a performance of any of the exemplary processes described herein, first computing system 102 may establish and maintain, within the one or more tangible, non-tangible memories, one or more structured or unstructured data repositories or databases, such as data repository 104. By way of example, data repository 104 may include, but is not limited to, a transaction database 106, a cryptographic library 108, and a trained model data store 110.

Transaction database 106 may include data records that identify and characterize one or more exchanges of data, e.g., transactions involving corresponding payment instrument, initiated by, or on behalf of, one or more customers of the first financial institution during prior temporal intervals. For example, and for a corresponding one of the initiated data exchanges, such as a purchase transaction, the data records of transaction database 106 may include a unique identifier of the data exchange (e.g., a correlation identifier assigned to the purchase transaction, etc.), counterparty data that identifies each of the counterparties to the data exchange (e.g., an IP address of customer device that initiated the purchase transaction, an IP address of a point-of-sale device or interface, data identifying a retailer, etc.), and positional information characterizing a geographical position associated with the data exchange (e.g., a geographic position of the customer device, the POS device or interface, etc.).

Further, the data records of transaction database may also include a value of one or more parameters that characterize the corresponding one of the initiated data exchanges, e.g., the purchase transaction describe herein. Examples of these parameter values include, but are not limited to, a transaction amount, a transaction date or time, and an identifier of the corresponding payment instrument (e.g., a tokenized or actual account number, etc.). The disclosed embodiments are, however, not limited to the examples of counterparty information, positional information, and transaction parameter values, and in other instances, the data records of transaction database 106 may maintain any additional or alternate counterparty information, positional information, parameter values, or elements of other data, that identify and characterize transactions and further, that are suitable for training the exemplary predictive fraud models described herein.

Cryptographic library 108 may maintain, among other things, an asymmetric cryptographic key pair associated with or assigned to associated with first computing system 102. As described herein, the asymmetric cryptographic key pair may include a homomorphic private cryptographic key and a corresponding homomorphic public cryptographic key, which may be generated in accordance with one or more homomorphic encryption schemes. In some instances, the one or more homomorphic encryption schemes may include a partially homomorphic encryption scheme, such as, but not limited to, an unpadded RSA encryption scheme, an El-Gamal encryption scheme, or a Pailler encryption scheme.

In other instances, an as described herein, the one or more homomorphic encryption schemes may include a fully homomorphic encryption scheme, which facilities arbitrary computations on ciphertext and generates encrypted results that, when decrypted, match the results of the arbitrary computations performed on corresponding elements of plaintext. Examples of these homomorphic encryption schemes include but are not limited to, a TFHE scheme that facilitates verifiable computations on integer ciphertext and a SEAL encryption scheme or a PALISADE encryption scheme that facilitates verifiable computations on floating-point ciphertext.

Referring back to FIG. 1, trained model data store 110 may include data that identifies and characterizes one or more of the privately trained predictive fraud models described herein. In some instances, when applied to elements of homomorphically encrypted transaction data characterizing a pending or executed transaction, each of the privately trained predictive fraud models may generate output data indicative of a likelihood that the pending or executed transaction represents an instance of fraudulent activity, e.g., based on a comparison of the output data with a corresponding threshold value. Examples of the one or more predictive fraud models include, but are not limited to, a linear or nonlinear regression model, a Ridge regression model, a Least Absolute Shrinkage Selector Operator (LASSO) model, a classification scheme, such as a logistic regression model, a decision-tree model or other machine learning model, and an artificial neural network model, such as an artificial feed-forward neural network model.

By way of example, each of the privately trained models may be characterized, and specified, by a corresponding set of model coefficients or model parameters (e.g., one or more of the regression models described herein) and the corresponding threshold value, as described herein. Further, the determined model coefficients, model parameters, and threshold values that specify the privately trained predictive fraud models may correspond to floating point values (e.g., suitable for application to transaction data encrypted in the SEAL or PALISADE encryption schemes described herein), or alternatively, may be scaled to integer values (e.g., suitable for application to transaction data encrypted in the TFHE encryption scheme described herein). In some instances, trained model data store 110 may maintain, for each of the privately trained predictive fraud models, a unique model identifier and corresponding elements of modelling data that include the adaptively determined model coefficients, model parameters, and threshold value.

Further, each of additional computing systems 200 may also establish and maintain, within the one or more tangible, non-tangible memories, one or more structured or unstructured data repositories or databases that include, among other things, a transaction database, a cryptographic library, and a trained model data store. For example, second computing system 202 may maintain, within the one or more tangible, non-transitory memories, a data repository 204 that includes, but is not limited to, a transaction database 206, a cryptographic library 208, and a trained model data store 210. In some instances, transaction database 206, cryptographic library 208, and trained model data store 210 may include elements of structured or unstructured data similar to that described above in reference to transaction database 106, cryptographic library 108, and trained model data store 110, e.g., as maintained in data repository 104 of first computing system 102.

Further, and by way of example, third computing system 302 may maintain, within the one or more tangible, non-transitory memories, a data repository 304 that includes, but is not limited to, a transaction database 306, a cryptographic library 308, and a trained model data store 310. In some instances, transaction database 306, cryptographic library 308, and trained model data store 310 may include elements of structured or unstructured data similar to that described above in reference to transaction database 106, cryptographic library 108, and trained model data store 110, e.g., as maintained in data repository 104 of first computing system 102.

Referring back to FIG. 1, first computing system 102 may perform any of the exemplary processes described herein to adaptively train and improve one or more of the predictive fraud models based on selected elements of the confidential transaction data maintained within transaction database 106, and based on an outcome of these exemplary adaptive training and improvement processes, generate corresponding ones of the model coefficients, model parameters, and thresholds that specify the one or more predictive fraud models. In some instances, as described herein, first computing system 102 may package the model coefficients, model parameters, and thresholds into corresponding elements of modelling data, which may be stored in trained model data store 110 in conjunction with the corresponding model identifier.

When executed by the one or more processors of first computing system 102, a training engine 112 may access the data records of transaction database 106. Executed training engine 112 may perform further operations that split or decompose the accessed data records into a first subset suitable for adaptively training the one or more predictive fraud models described herein (e.g., training data 114) and a second subset suitable for testing and characterizing an accuracy of each of the adaptively trained predictive fraud models described herein (e.g., testing data 116). By way of example, and without limitation, the first and second subsets may include confidential transaction data that characterizes initiated purchase transactions involving payment instruments (e.g., credit card accounts) issued to customers of the first financial institution, and a specified number of the elements of transaction data packaged into each of training data 114 and testing data 116 represent instances of fraudulent activity. By way of example, and without limitation, training data 114 may include transaction data characterizing 230,000 discrete purchase transactions, of which 394 represent instances of fraud, and testing data 116 may include transaction data characterizing 57,000 discrete purchase transactions, of which 98 represent instances of fraud, etc.).

In some instances, executed training engine 112 may perform operations that normalize portions of the transaction data included within training data 114 (e.g., that normalize each transaction amount within the transaction data to range from zero to unity, etc.) and that adaptively train each of the one or more predictive fraud models against the elements of the transaction data included within training data 114. Based on the performance of these adaptive training processes, executed training engine 112 may compute the model coefficients or model parameters for each of the one or more predictive fraud models, and determine the threshold value for each of the one or more predictive fraud models (e.g., based on a determined relationship between predicted true positive rates and false positive rates, etc.). As described herein, each of the determined threshold values may distinguish fraudulent from non-fraudulent activity when compared against corresponding elements of output data Training engine 112 may perform further operations that, based on the determined model coefficients, model parameters, and threshold value, apply each of the one or more predictive fraud models to corresponding elements of testing data 116 and determine a value indicative of an accuracy of each of the one or more predictive fraud models based on, for example, a percentage of true positives (e.g., a percentage of the total number of transactions characterized by testing data 116 identified correctly as fraudulent activity) or a percentage of true negatives (e.g., a percentage of the total number of transactions characterized by testing data 116 identified correctly as non-fraudulent activity). If training engine 112 were to establish that the metric value falls below a predetermined value (e.g., 90%) for a corresponding one of the predictive fraud models, training engine 112 may perform additional operations that continue to iteratively train, improve, and text the corresponding predictive fraud model using any of the exemplary processes described herein.

Alternatively, if training engine 112 were to establish that the metric value exceeds the predetermined value for a corresponding one of the predictive fraud models, training engine 112 may deem, the corresponding predictive fraud model trained and suitable for deployment. Training engine 112 may also compute components of a confusion matrix for the newly trained predictive fraud model, and may perform operations that, for the newly trained predictive fraud model, package the determined model coefficients or parameters and the determined threshold into corresponding portions of modelling data 118. In one example, the determined model coefficients or parameters and the determined threshold for the newly trained predictive fraud model may include floating-point values, and training engine 112 may provide modelling data 118 as an input to a scaling module 121 of first computing system 102. When executed by the one or more processors of first computing system 102, scaling module 121 may perform operations that scale each of the floating-point values to corresponding integer values, and generate scaled modelling data 122 that includes the scaled model coefficients or parameters and the scaled threshold.

In some instances, the integer-valued model coefficients, the integer-valued model parameters, and/or the integer-valued threshold maintained within scaled modelling data 122 may be consistent with certain of the homomorphic encryption schemes described herein, such as the TFHE scheme described herein, and scaling module 121 may store scaled modelling data 122 within a corresponding portion of trained model data store 110, e.g., in conjunction with unique model identifier 124. In other instances, not depicted in FIG. 1, the floating-point model coefficients, model parameters, and/or threshold values maintained within modelling data 118 may be consistent with additional ones of the homomorphic encryption schemes described herein, such as the SEAL or PALISADE encryption schemes, and training engine 112 may perform operations that store portions of modelling data 118 within trained model data store 110 directly and without scaling.

Further, although not illustrated in FIG. 1, training engine 112 may perform any of the exemplary processes described herein, either alone or in conjunction with scaling module 121, to adaptively train, test, and improve any additional or alternate one of the predictive fraud models described herein, which may be available for application to corresponding elements of transaction data characterizing suspect transactions. Further, one or more of additional computing systems 200, such as second computing system 202 or third computing system 302, may also perform any of the exemplary processes described herein to adaptively train, test, and improve any of the exemplary predictive fraud models described herein, e.g., based on locally accessible and confidential elements of transaction data.

In some exemplary embodiments, second computing system 202 may receive transaction data characterizing one or more pending transactions involving corresponding payment instruments, e.g., from one or more point-of-sale (POS) devices or from other devices operated by customers of the second financial institution. Prior to submitting the received elements of transaction data to one or more appropriate transaction processing networks (e.g., a payment rail, etc.), second computing system 202 may perform operations that apply one or more of the now-trained predictive fraud models to the received transaction data. As described herein, examples of the predictive fraud models include, but are not limited to, a linear or nonlinear regression model, a Ridge regression model, a LASSO model, a classification scheme, such as a logistic regression model, a decision-tree model or other machine learning model, and an artificial neural network model.

For example, second computing system 202 may perform operations that access trained model data store 210, and access modelling data that includes model coefficients or parameters and a threshold for a corresponding one of the now-trained predictive fraud models. Second computing system 202 may apply the corresponding predictive fraud model to the received transaction data in accordance with the accessed model coefficients or parameters and generate corresponding elements of output data characterizing a likelihood that each elements of the received transaction data, and corresponding ones of the pending or initiated transactions, represent instances of fraudulent activity. Based on a comparison between the accessed threshold value and the corresponding elements of the output data, second computing system 202 may determine that a particular element of the received transaction data, and a particular one of the transactions, represents potentially fraudulent activity.

In one instance, second computing system 202 may determine that the particular transaction represents potentially fraudulent activity when a value of the corresponding output data element exceeds the threshold value. In other instances, second computing system 202 may determine that the particular transaction represents potentially fraudulent activity when the value of the corresponding output data element fails to exceed the threshold value, and when certain of the parameter values that characterize the particular transaction are inconsistent with expected parameter values (e.g., when a transaction amount of the particular transaction exceeds an average transaction value during a prior time period, or when a transaction velocity resulting from the particular transaction exceeds an average transaction velocity during the prior time period). In some instances, and responsive to determination that the particular transaction represents potentially fraudulent activity, second computing system 202 may decline to submit the transaction data elements characterizing the particular transaction to an appropriate transaction processing network, and may perform operations that either discard that transaction data elements or request additional confirmation from a device operated by a customer (e.g., through data transmitted across network 120 to the device).

In other exemplary embodiments, described below in reference to FIGS. 2A and 2B, second computing system 202 may generate homomorphically encrypted transaction data that characterizes the particular transaction, and may poll one or more additional computing systems operating within environment 100, such as first computing system 102, to obtain homomorphically encrypted output data characterizing a likelihood that the particular transaction represents fraudulent activity. As described herein, first computing system 102 may receive the homomorphically encrypted transaction data, may apply one or more predictive fraud models through a performance of verifiable homomorphic computations on portions of the homomorphically encrypted transaction data, and based on the application of the one or more predictive fraud models, generate elements of the homomorphically encrypted output data for transmission across network 120 to second computing system 202. In some instances, second computing system 202 may receive the elements of the homomorphically encrypted output data from first computing system 102, and from any additional or alternate ones of the computing systems within environment 100, and may decrypt the homomorphically encrypted output data to determine the likelihood that the particular transaction represents fraudulent activity, either on an individual basis or through ensemble-based decision protocols.

Through these exemplary processes, second computing system 202 may maintain the confidentiality of not only the underlying transaction data, e.g., that characterizes the particular transaction, but also the output data indicative of the likelihood that the particular transaction represents fraudulent activity, while preserving an ability to access predictive models privately trained and maintained by other computing systems operation within environment 100. Further, certain of these exemplary processes enable first computing system 102 to maintain the confidentiality of the model coefficients, model parameters, or threshold values that characterize each of the privately trained predictive models, while facilitating interaction with confidential third-party data maintained by other computing systems operating within environment 100.

Figure 2A:
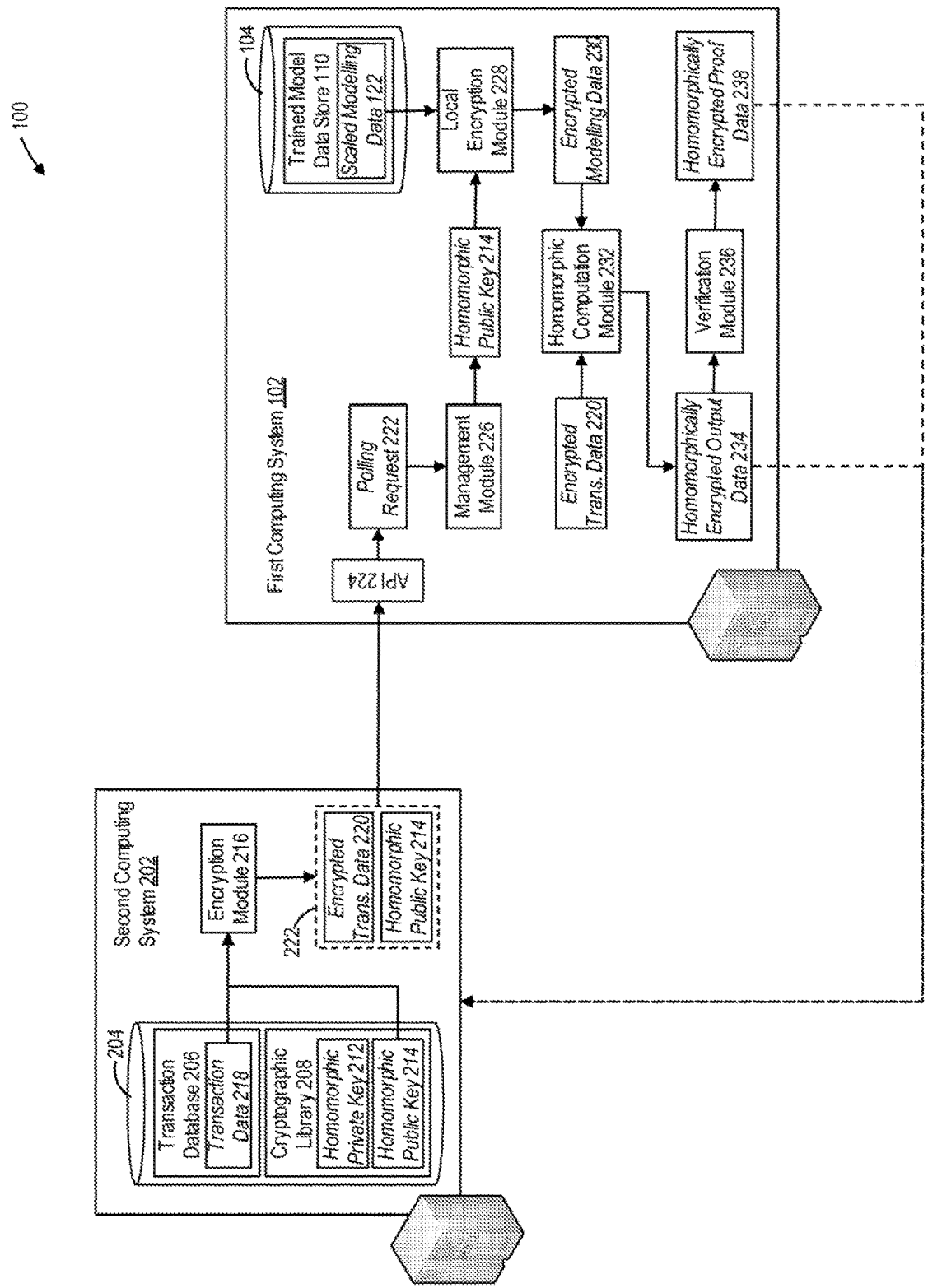

Referring to FIG. 2A, second computing system 202 may perform operations that generate an asymmetric cryptographic key pair using any appropriate one or more appropriate key-generation algorithms. For example, the asymmetric cryptographic key pair may include a homomorphic private cryptographic key 212 and a corresponding homomorphic public cryptographic key 214, each of which may be generated in accordance with any of the homomorphic encryption schemes described herein. Examples of these homomorphic encryption schemes include, but are not limited to, the TFHE scheme that facilitates verifiable computations on integer ciphertext and the SEAL or PALISADE encryption schemes that facilitate verifiable computations on floating-point ciphertext. In some instances, second computing system 202 may perform operations that store homomorphic private cryptographic key 212 and homomorphic public cryptographic key 214 within corresponding portions of cryptographic library 208, e.g., as maintained within data repository 204.

In some instances, the one or more processors of second computing system 202 may execute an encryption module 216, which may perform operations that access the structured or unstructured data records of transaction database 206 (e.g., as maintained within data repository 204), and access transaction data 218 that identifies and characterizes a particular pending or initiated transaction. The particular transaction may, for example, represent a potential instance of fraudulent activity, which second computing system 22 may identify using any of the processes described herein.

By way of example, transaction data 218 may include, among other things, a correlation identifier assigned to the particular transaction, counterparty data that identifies each of the counterparties to the particular transaction (e.g., an IP address of a customer device that initiated the particular transaction, an IP address of a point-of-sale device or interface, data identifying a retailer), and positional information characterizing a geographical position associated with the particular transaction (e.g., a geographic position of the customer device, the POS device or interface, etc.). Further, and as described herein, transaction data 218 may also include values of transaction parameters that characterize the particular transaction, such as, but not limited to, a transaction amount, a transaction date or time, and an identifier of the corresponding payment instrument (e.g., a tokenized or actual account number, etc.).

Further, and as illustrated in FIG. 2A, encryption module 216 may also access cryptographic library 208 and extract homomorphic public cryptographic key 214. In some instances, encryption module 216 may encrypt transaction data 218 using homomorphic public cryptographic key 214 (e.g., to generate encrypted transaction data 220), and may package encrypted transaction data 220 and homomorphic public cryptographic key 214 into corresponding portions of a polling request 222. In some instances, and prior to encryption using homomorphic public cryptographic key 214, encryption module 216 may perform operations that scale each floating-point value within transaction data 218 to a corresponding integer value, e.g., for consistency with the homomorphic encryption scheme associated with homomorphic public encryption key 214.

Encryption module 216 may also perform operations that cause second computing system 202 to transmit polling request 222 across network 120 to first computing system 102, e.g., using any appropriate communications protocol. In some instances, first computing system may perform any of the exemplary processes described herein to apply one or more predictive fraud models through a performance of verifiable, homomorphic computations on portions of encrypted transaction data 220, and to generate homomorphically encrypted output data that, when decrypted by second computing system 202, indicates a likelihood that the particular transaction represents fraudulent activity.

For example, a secure programmatic interface of first computing system 102, e.g., application programming interface (API) 224, may receive polling request 222 and may provide polling request 222 as an input to a management module 226 of first computing system 102. When executed by the one or more processors of first computing system 102, management module 226 may perform operations that parse polling request 222 and extract corresponding ones of encrypted transaction data 220 and homomorphic public cryptographic key 214. Further, management module 226 may provide homomorphic public cryptographic key 214 as an input to a local encryption module 228 of first computing system 102 and additionally, may provide all or a portion of encrypted transaction data 220 as an input to a homomorphic computation module 232 of first computing system 102.

When executed by the one or more processors of first computing system 102, local encryption module 228 may receive homomorphic public cryptographic key 214, and may extract, from scaled modelling data 122, the model coefficients, the model parameters, and/or the threshold value that specify and characterize a corresponding one or the predictive fraud models. In some instances, local encryption module 228 may encrypt the model coefficients (and/or the model parameters) and the threshold value using homomorphic public cryptographic key 214 (e.g., to generate homomorphically encrypted model coefficients and/or parameters and a homomorphically encrypted threshold value). Further, local encryption module 228 may perform operations that package the homomorphically encrypted model coefficients (and/or the homomorphically encrypted model parameters) and the homomorphically encrypted threshold value into corresponding portions of encrypted modelling data 230, which local encryption module 228 may provide as an input to homomorphic computation module 232.

Further, and when executed by the one or more processors of first computing system 102, homomorphic computation module 232 may receive encrypted modelling data 230, which includes the homomorphically encrypted model coefficients (and/or homomorphically encrypted model parameters) and the homomorphically encrypted threshold value that characterize the corresponding one of the predictive fraud models, and may also receive encrypted transaction data 220, which includes the homomorphically encrypted transaction parameter values that characterize the pending or initiated transaction. In some instances, homomorphic computation module 232 may perform homomorphic computations that apply the corresponding predictive fraud model to each element of encrypted transaction data 220 in accordance with the homomorphically encrypted model coefficients (and/or model parameters). Based on the homomorphically encrypted threshold value, homomorphic computation module 232 may generate homomorphically encrypted output data 234 that indicates of a predicted likelihood that the particular transaction (e.g., as characterized by encrypted transaction data 220) represents an instance of fraudulent activity.

For example, homomorphically encrypted output data 234 may include binary output data that characterizes the predicted likelihood that the particular transaction represents fraudulent activity, e.g., a homomorphically encrypted value of zero for a predicted occurrence of non-fraudulent activity, and a homomorphically encrypted value of unity for a predicted occurrence of fraudulent activity. Further, in some instances, first computing system 102 may perform the homomorphic computations that apply the corresponding predictive fraud model to encrypted transaction data 220 may be implemented in conjunction within one or more additional computing systems operations within environment 100, e.g., in parallel across a distributed computing system, such as, but not limited to a cloud-based network.

In some exemplary embodiments, the homomorphic computations that facilitate the application of the corresponding one of the predictive fraud models to encrypted transaction data 220 may be tailored or selected for consistency with a homomorphic encryption scheme associated with encrypted transaction data 220 and encrypted modelling data 230. For example, certain of the homomorphic encryption schemes described herein, which facilitate verifiable computations on integer ciphertext (e.g., the TFHE scheme), support operations that include, but are not limited to: integer-based addition operations or subtraction operations (e.g., via an additional of a signed integer); integer-based multiplication operations; integer-based comparison operations (e.g., a minimization across two integers); integer-based matrix multiplication; integer-based scalar or dot products; and integer-based operations involving decision tree algorithms (e.g., based on a pre-computation of all decision paths for a given class and a corresponding summation for that given class).

To facilitate a consistency with these supported operations, certain of the floating-point model coefficients, model parameters, or thresholds that characterize the predictive models (e.g., the LASSO model or the ridge regression model) can be scaled to corresponding integer values prior to the application of the corresponding predictive fraud model to the encrypted transaction data 220 by homomorphic computation module 232. While many of the predictive models described herein are specified in terms of one or more of these operations (e.g., the linear or non-linear regression models, which rely on addition and multiplication operations, and certain comparison operations between integer values), certain of these predictive fraud models require a computation of, one or more non-linear, exponential, or logarithmic functions, which can be approximated as polynomial functions (e.g., representative of combinations of the supported operations) prior to the application of the corresponding predictive fraud model to encrypted transaction data 220 by homomorphic computation module 232.

For example, certain of the predictive fraud models described herein, such as a logistic regression model, may evaluate a sigmoid function, e.g., $y(x)=1/1+e^{-x}$. In some instances, and prior to the performance of the homomorphic computations described herein, the sigmoid function that specifies one or more of the predictive fraud models may be approximated by a Taylor series expansion having a specified degree, e.g., $y(x)=1/2+x/4+x^3/48+x^5/480$. In other examples, one or more of the artificial neural network models described herein may define a transfer function in terms of the sigmoid function (e.g., $y(x)=1/1+e^{-x}$) or in terms of one or more additional or alternate exponential functions (e.g., $y(x)=e^{\beta_0+\beta_1 x_1+\beta_2 x_2}$). Prior to the performance of the homomorphic computations described herein, the sigmoid transfer function may be approximated by the Taylor series expansion described herein, and the additional or alternate exponential functions can be approximated as polynomials using appropriate Taylor or Maclaurin expansions (e.g., that require only integer-based addition or multiplication processes).

In other instances, additional ones of the homomorphic encryption schemes described herein facilitate verifiable computations on floating-point ciphertext (e.g., the SEAL or PALISADES encryption scheme). Although these additional homomorphic encryption schemes may support operations similar to those that facilitate verifiable computations on integer ciphertext, these additional homomorphic encryption schemes may be incapable of supporting certain of the comparison operations implemented by the artificial neural network models, e.g., through minimization or maximization operations implemented the pooling or rectification processes, or the operations that compare an output of the predictive fraud models against corresponding threshold values.

For example, and prior to the performance of the homomorphic computations described herein, certain of these maximization or minimization operations may be approximated as a scalar multiple of an output of the pooling or rectification functions evaluated within one or more artificial neural network models. In other examples, and prior to the comparison of the predictive fraud models against corresponding threshold values, homomorphic computation module 232 may perform operations that add additional random noise to selective decrypted, and re-encrypted, portions of binary output data, and may implement the comparison operations based on a multi-step process that subtracts the homomorphically encrypted output data (which includes additional noise) from the homomorphically encrypted threshold value, and then identify a positive or negative sign that characterizes the difference.

Referring back to FIG. 2A, homomorphic computation module 232 may perform operations that cause first computing system 102 to transmit homomorphically encrypted output data 234 across network 120 to second computing system 202, e.g., using any appropriate communications protocol and as a response to polling request 222. In other instances, homomorphic computation module 232 may also provide homomorphically encrypted output data 234 as an input to a verification module 236 that, when executed by the one or more processors of first computing system 102, generates homomorphically encrypted proof data 238 representing a zero-knowledge proof of homomorphically encrypted output data 234.

By way of example, executed verification module 236 may receive homomorphically encrypted output data 234. In some instances, executed verification module 236 may perform operations that: (i) generate a proving key (e.g., proving key $P_K$) and a verifying key (e.g., verifying key $S_K$) based on an implementation of a randomized key generation algorithm (e.g., KeyGen(F, λ)→($P_K$, $S_K$)) in accordance with the corresponding one of the predictive fraud models (e.g., predictive fraud model F) and a security parameter (e.g., security parameter λ); and (ii) compute homomorphically encrypted proof data 238 (e.g., encoded value σy) representing the zero knowledge proof of homomorphically encrypted output data 234. By way of example, executed verification module 236 may compute homomorphically encrypted proof data 238 (e.g., encoded value σy) based on the proving key $P_K$, the homomorphically encrypted values of the model coefficients, parameters, and/or thresholds (e.g., as specified within encrypted modelling data 230), and encrypted transaction data 220 (e.g., as Compute($P_K$, x, $Z_{ENC}$)→σy). The encoded value σy (e.g., as specified by homomorphically encrypted proof data 238) may correspond to the zero-knowledge proof that y=F(x,$Z_{ENC}$).

In some instances, verification module 236 may perform operations that cause first computing system 102 to transmit homomorphically encrypted proof data 238, which includes the encoded value σy corresponding to the zero-knowledge proof, across network 120 to second computing system 202, either alone or combination with homomorphically encrypted output data 234. In other instances, verification module 236 may perform additional operations that cause first computing system 102 to transmit homomorphically encrypted proof data 238 across network 120 to one or more peer computing systems, which may perform consensus-based operations that records homomorphically encrypted proof data 238 into an additional ledger block of a distributed ledger, which may be accessible to participants in a distributed-ledger network, such as first computing system 102, second computing system 202, and one or more of additional computing systems 200.

Figure 2B:
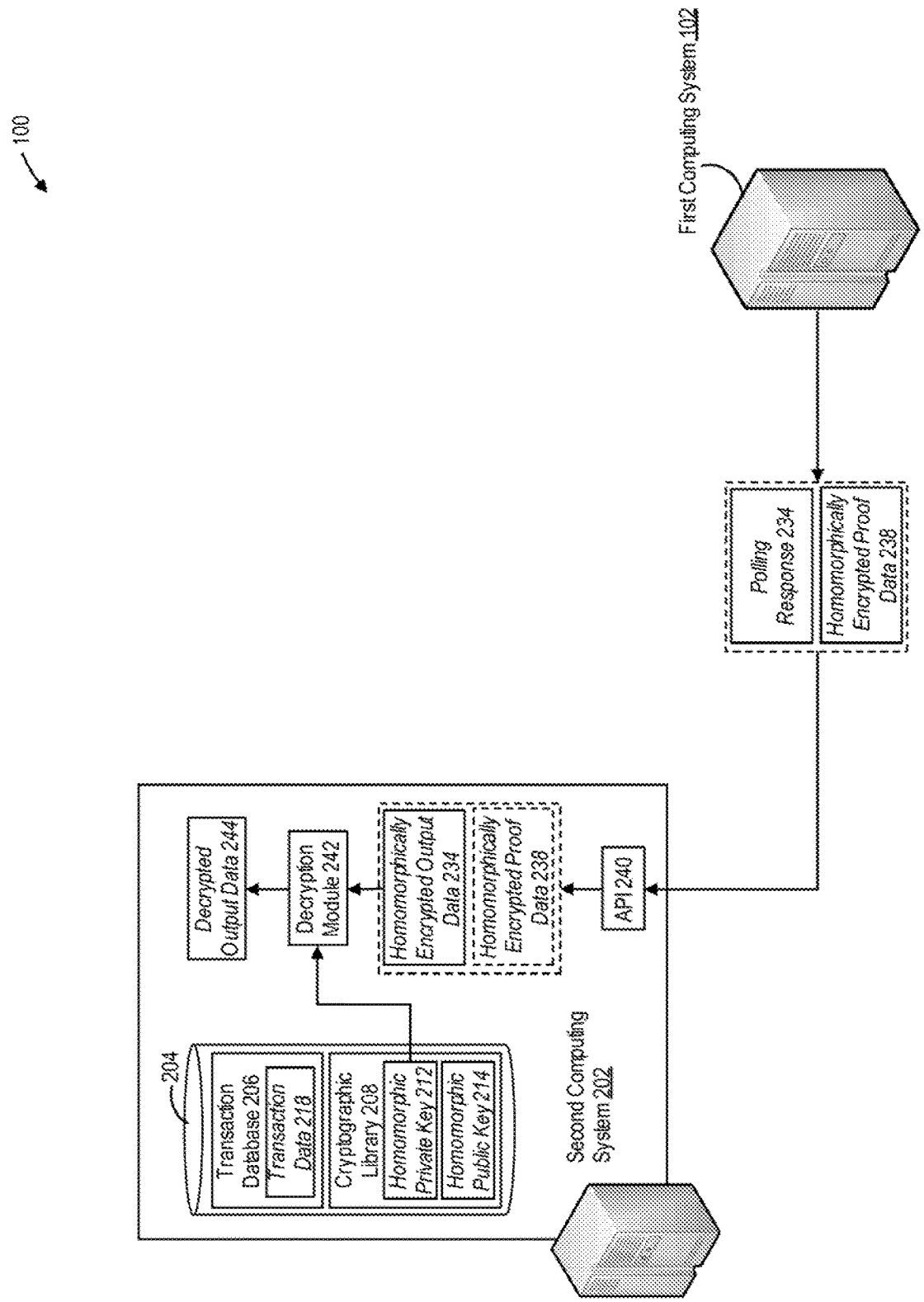

Referring to FIG. 2B, a secure programmatic interface of second computing system 202, such as application programming interface (API) 240 may receive homomorphically encrypted output data 234. API 240 may also receive homomorphically encrypted proof data 238 that includes the encoded value σy corresponding to the zero-knowledge proof, e.g., along or in combination with homomorphically encrypted output data 234.

In some instances, API 240 may route homomorphically encrypted output data 234 to a decryption module 242 of second computing system 202. When executed by the one or more processors or second computing system 202, decryption module 242 may access cryptographic library 208 (e.g., as maintained within data repository 204) and extract homomorphic private cryptographic key 212. Executed decryption module 242 may perform operations that decrypt all or a portion of homomorphically encrypted output data 234 using homomorphic private cryptographic key 212, and that generate decrypted output data 244 indicative of a predicted likelihood that the pending or initiated transaction represents fraudulent activity. For example, and as described herein, decrypted output data 244 may include a binary integer value indicative of a likelihood that the pending or initiated transaction represents fraudulent activity, e.g., a value of unity for likely fraud, or a value of zero of no fraud.

Further, although not illustrated in FIG. 2B, an additional application module executed by the one or more processors of second computing system 202 may receive homomorphically encrypted proof data 238 (e.g., that includes the encoded value σy), and execute a verification function based on actual transaction data 218 characterizing the pending or initiated transaction (e.g., actual values Z) and on the encoded value ay (e.g., $\text{Verify}_{SK}$(Z, σy)→true/false). In other instances, also not illustrated in FIG. 2B, the additional executed application program may access a local copy of the distributed ledger (e.g., as maintained within data repository 204), and extract the encoded value ay representative of the zero-knowledge proof from the additional ledger block of the distributed ledger. Second computing system 202 may perform any of the exemplary processes described herein to verify the zero-knowledge proof based on the now-extracted encoded value σy and on transaction data 218.

In some exemplary embodiments, and through the application the homomorphic encryption schemes and the implementation of the verifiable, homomorphic computations described herein, first computing system 102 may publish, and render accessible to other computing systems operating within environment 100, a privately trained predictive fraud model while maintaining not only the confidentiality of the trained model coefficients or parameters and corresponding threshold value, but also the confidentiality of any sensitive transaction data provided as an input to the published predictive fraud model by the other computing systems, such as second computing system 202. In other exemplary embodiments, one or more additional computing systems operating within environment 100, e.g., a subset of additional computing systems 200, may perform any of the exemplary processes described herein to privately train an additional predictive fraud model based on locally maintained elements of confidential transaction data, and to publish confidentially and render these additional predictive fraud models accessible to over participants in environment 100 using any of the homomorphic encryption schemes and verifiable, homomorphic computations described herein.

For example, although not illustrated in FIG. 2A or 2B, second computing system 202 may transmit polling request 222 (e.g., that includes encrypted transaction data 220 and homomorphic public cryptographic key 214) across network 120 to the subset of additional computing systems 200. Each of the subset of additional computing systems 200 may perform any of the exemplary processes described herein to apply a corresponding privately trained predictive fraud model (e.g., which may be different from the predictive fraud model privately trained by first computing system 102) to encrypted transaction data 220 in accordance with a corresponding set of homomorphically encrypted model coefficients or model parameters. Further, based on a corresponding homomorphically encrypted threshold value, the subset of additional computing systems 200 may each generate a corresponding element of homomorphically encrypted output data, and transmit the corresponding element of homomorphically encrypted output data across network 120 to second computing system 202 (e.g., either alone or in conjunction with homomorphically encrypted proof data).

Second computing system 202 may receive each of the elements of homomorphically encrypted output data from the subset of additional computing systems 200, e.g., through API 240. In some instances, executed decryption module 242 may perform any of the exemplary processes described herein to decrypt each of the elements of homomorphically encrypted output data using homomorphic private cryptographic key 212, and to generate additional elements of decrypted output data indicative of a likelihood that the particular transaction represents fraudulent activity, e.g., based on the application of the each of the corresponding privately trained predictive fraud models to encrypted transaction data 220.

By way of example, second computing system 202 may establish that the pending or initiated transaction represents fraudulent or non-fraudulent activity based on a collective analysis of decrypted output data 244 in conjunction with each of the additional elements of decrypted output data, e.g., based on an implementation of ensemble-based decision protocols. For instance, based on these ensemble-based decision protocols, second computing system 202 may establish that the pending or initiated transaction represents fraudulent activity (or non-fraudulent activity) when (i) a majority of first computing system 102 and the additional computing systems predict that pending or initiated transaction represents fraudulent (or non-fraudulent) activity, or (ii) when a predetermined fraction, such as 75%, of first computing system 102 and the additional computing systems predict that pending or initiated transaction represents fraudulent (or non-fraudulent) activity.

In some instances, the repeated generation and transmission of elements of homomorphically encrypted output data (e.g., homomorphically encrypted output data 234 of FIGS. 2A and 2B) to second computing system 202 by first computing system 102 and each of the subset of additional computing systems 200 may be computationally inefficient, and can decrease a network bandwidth characterizing network 120 and other communications networks that interconnect systems and devices within environment 100, especially when the subset of additional computing systems 200 includes a large number of computing systems. Further, the repeated transmission of elements of homomorphically encrypted output data across network 120, and the repeated receipt of these elements of homomorphically encrypted output data by second computing system 202, may increase a likelihood of fraudulent activity or unauthorized access by malicious third parties (e.g., man-in-the-middle attacks, etc.).

Further, the reliance of second computing system 202 on the elements of homomorphically encrypted output data generated by first computing system 102 and each of the subset of additional computing systems 200 implies an established level of trust between the second financial institution and each of the first financial institution and the additional financial institutions or related entities (e.g., that the privately generated models accurately and effectively predict likelihood of fraud, etc.). Although the established trust may be appropriate for models generated by large financial institutions or well-known related entities, such as a regulators or certain consortia, the second financial institution may be susceptible to certain biases or inaccuracies derived from an incomplete or improper application of the predictive models by less reputable entities, or from an inaccurately derived or trained predictive models.

In view of these deficiencies, certain of the exemplary embodiments enable a network-connected computing system operated by a centralized authority, such as third computing system 302, to receive discrete elements of modelling data that identify and characterize predictive fraud models privately trained by each of first computing system 102 and the subset of additional computing systems 200, and to store the discrete elements of modelling data within a corresponding data repository. The centralized authority may, for example include a governmental entity, a regulatory entity, a consortium of financial institutions, or a service provider associated with the financial services industry. Further, the centralized authority may establish certain policies that, when applied to a potentially unknown financial institution that submits elements of modelling data to third computing system 302, establishes trust between the second financial institution and the potentially unknown financial institution and ensure a reputability of that entity and a robustness of the underlying predictive fraud model generated and trained privately by the potentially unknown financial institution.

Figure 3A:
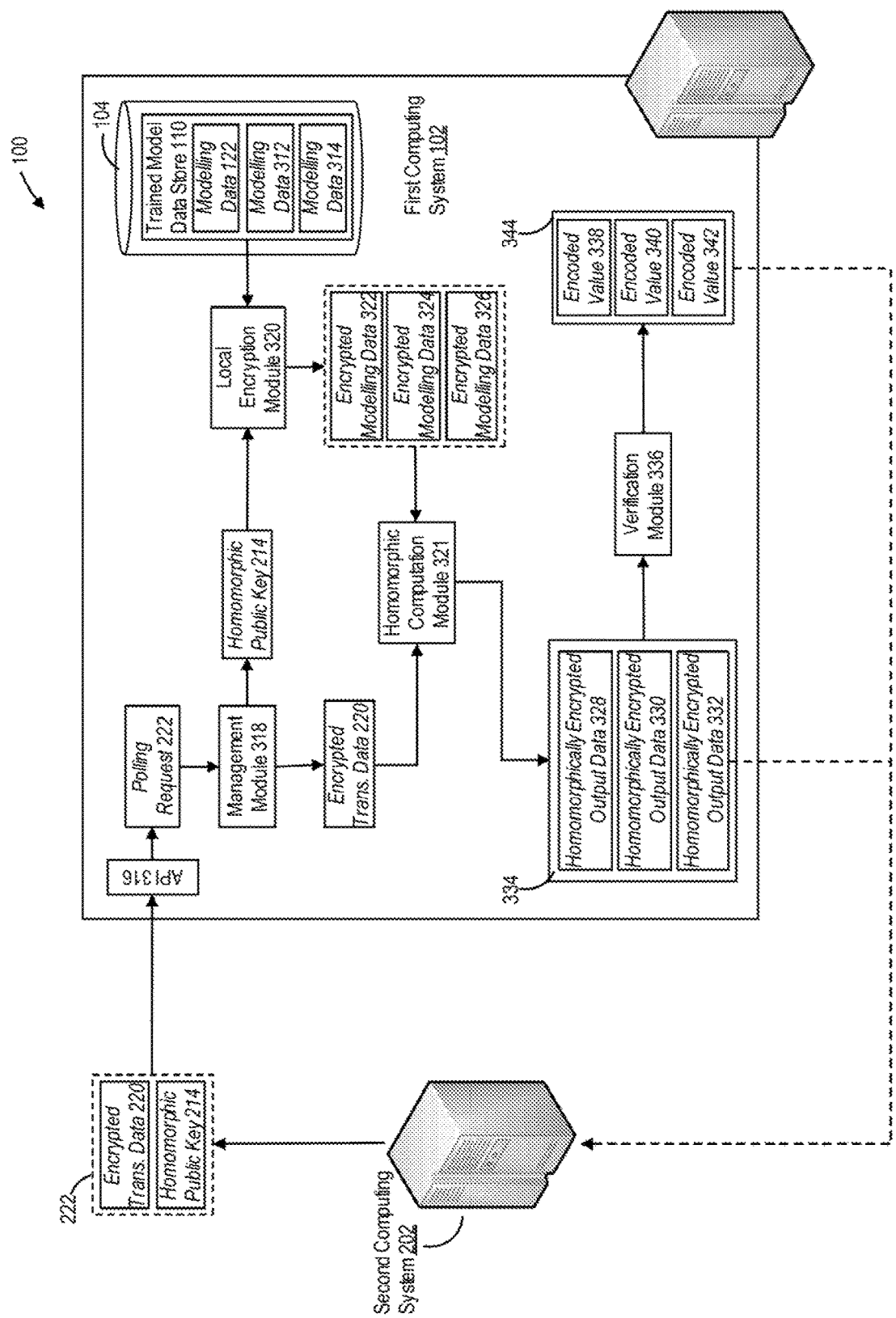

Referring to FIG. 3A, third computing system 302 may receive discrete elements of modelling data from first computing system 102 and from the subset of additional computing systems 200, and may perform operations that store the discrete elements of modelling data within corresponding portions of trained model data store 310. For example, third computing system 302 may receive all or a portion of modelling data 122 from first computing system 102 and as illustrated in FIG. 3A, third computing system 302 may store modelling data 122 within a corresponding portion of trained model data store 310. As described herein, modelling data 122 may include scaled (or unscaled) modeled coefficients or parameters and a threshold value specifying a first predictive fraud model privately trained by first computing system 102, e.g., based on locally maintained elements of confidential transaction data using any of the exemplary processes described herein.

Third computing system 302 may also receive modelling data 312 and modelling data 314 from corresponding ones of additional computing systems 200 and, as illustrated in FIG. 3A, third computing system 302 may store modelling data 312 and modelling data 314 within a corresponding portion of trained model data store 310. As described herein, modelling data 312 and modelling data 314 may include scaled (or unscaled) modeled coefficients or parameters and a threshold value specifying respective ones of a second and a third predictive fraud model privately trained by the corresponding ones of additional computing systems 200, e.g., based on locally maintained elements of confidential transaction data using any of the exemplary processes described herein.

The disclosed embodiments are, however, not limited to, processes by which third computing system 302 receive modelling data 122, modelling data 312, and modelling data 314, which specify corresponding ones of the first, second, and third privately trained predictive fraud models described herein. In other instances, and consistent with the disclosed embodiments, third computing system 302 may receive, store, and perform operations consistent with any additional or alternate sets of modelling data, which correspond to any additional or alternate ones of the privately trained predictive fraud models described herein.

Additionally, in some instances, one or more modelling data 122, modelling data 312, modelling data 314 may be encrypted using a public cryptographic key associated with the centralized authority. By way of example, a computing system operated by the centralized authority (e.g., third computing system 302) may broadcast the public cryptographic key associated with the centralized authority to first computing system 102, the subset of additional computing systems 200, and any other computing system that participates in the distributed-ledger network described herein.

In further examples, not illustrated in FIG. 3A, third computing system 302 may also maintain, within data repository 304, elements of policy data that identify and characterize one or more model retention and application policies, which establish enforce certain institution- or model-specific restrictions on any financial institution that submits modelling data for storage and ultimate application to homomorphically encrypted transaction data by third computing system 302. For instance, the one or more model retention and application policies may specify restrictions on a type of the predictive fraud model (e.g., that excludes a predictive fraud model shown unreliable through academic study or practical application, etc.) or on a degree of private training (e.g., that a tested accuracy of the privately trained model exceeds a particular accuracy, such as 90%, etc.). In other instances, the one or more model retention or application policies may impose certain restrictions on a financial institution that submits modelling data for retention and application, such as, but not limited to, restrictions on an institution size, a geographic restriction, or restrictions related to a regulatory status of the financial institution. For example, the one or more model retention or application policies may establish a list of financial institution permitted to submit modelling data, and a corresponding list of financial institution not permitted to submit modelling data.

In some instances, third computing system 302 may perform operations that access the stored policy data and apply the one or more model retention or application policies to each of the received elements of modelling data, e.g., modelling data 122, modelling data 312, and modelling data 314 described herein. If third computing system 302 were to determine that one of the received elements of modelling data fails to comply with the applied model retention and application policies, third computing system 302 may reject that elements of modelling data that a transmit an error message to the computing system that submitted the modelling data. Alternatively, if third computing system 302 were to establish that the received element of modelling data complies with each of the applied model retention and application policies, third computing system 302 may perform operations that store the received element of modelling data within a corresponding portion of trained model data store 310.

Referring back to FIG. 3A, second computing system 202 may perform any of the exemplary processes described herein to package encrypted transaction data 220 (e.g., transaction data 218 representative of the pending or initiated transaction encrypted using homomorphic public cryptographic key 214) and homomorphic public cryptographic key 214 into corresponding portions of polling request 222, and to transmit polling request 222 across network 120 to third computing system 302, e.g., using any appropriate communications protocol. In some instances, and through any of the exemplary processes described herein, third computing system 302 may perform homomorphic processes that apply each of the first, second, and third privately trained, predictive fraud models to portions of encrypted transaction data 220, and that generate model-specific elements homomorphically encrypted output data. As described herein, and when decrypted by second computing system 202, each of the model-specific elements homomorphically encrypted output data indicate a likelihood that the pending or initiated transaction represents fraudulent activity, and facilitate an implementation of any of the ensemble-based decision protocols described herein by second computing system 202.

For example, a secure programmatic interface of third computing system 302, e.g., application programming interface (API) 316, may receive polling request 222 and may provide polling request 222 as an input to a management module 226 of third computing system 302. When executed by the one or more processors of third computing system 302, management module 318 may perform operations that parse polling request 222 and extract corresponding ones of encrypted transaction data 220 and homomorphic public cryptographic key 214. Further, management module 318 may provide homomorphic public cryptographic key 214 as an input to a local encryption module 320 of third computing system 302 and additionally, may provide all or a portion of encrypted transaction data 220 as an input to a homomorphic computation module 321 of third computing system 302.

When executed by the one or more processors of third computing system 302, local encryption module 320 may receive homomorphic public cryptographic key 214, and may access each of modelling data 122, modelling data 312, and modelling data 314, and extract sets of the model coefficients and/or parameters and the threshold value that specifies and characterizes the corresponding one of the first, second, and third predictive fraud models. In one example, and as described herein, one or more of modelling data 122, modelling data 312, and modelling data 314 may be encrypted using the public cryptographic key of the centralized authority, and local encryption module 320 may perform operations that obtain a private cryptographic key associated with the centralized authority (e.g., as maintained within a software- or hardware-based secure element) and decrypt one or more of modelling data 122, modelling data 312, and modelling data 314 using the private cryptographic key of the centralized authority.

In some instances, local encryption module 320 may perform operations that encrypt the model coefficients and/or parameters and the threshold value within each of the extracted sets using homomorphic public cryptographic key 214 (e.g., to generate sets of homomorphically encrypted model coefficients (and/or model parameters) and threshold value), and to package the sets of homomorphically encrypted model coefficients (and/or model parameters) and the homomorphically encrypted threshold value corresponding ones of encrypted modelling data 322, encrypted modelling data 324, and encrypted modelling data 326. In some instances, encrypted modelling data 322, encrypted modelling data 324, and encrypted modelling data 326 may facilitate an application of corresponding ones of the first, second, and third predictive fraud modules through homomorphic computations on encrypted transaction data 220, and local encryption module 320 may provide each of encrypted modelling data 322, encrypted modelling data 324, and encrypted modelling data 326 as inputs to homomorphic computation module 321.

When executed by the one or more processors of first computing system 102, homomorphic computation module 232 may receive encrypted modelling data 322, encrypted modelling data 324, and encrypted modelling data 326, which includes the homomorphically encrypted model coefficients and/or parameters and the homomorphically encrypted threshold value that characterize corresponding ones of the first, second, and third predictive fraud models, and may also receive encrypted transaction data 220, which includes the homomorphically encrypted transaction parameter values that characterize the pending or initiated transaction. In some instances, homomorphic computation module 321 may perform any of the exemplary homomorphic computations described herein that apply each of the first, second, and third predictive fraud models to each element of encrypted transaction data 220, in accordance with the homomorphically encrypted model coefficients or model parameters specified within corresponding ones of encrypted modelling data 322, encrypted modelling data 324, and encrypted modelling data 326.

Further, and based on the homomorphically encrypted threshold value specified within corresponding ones of encrypted modelling data 322, encrypted modelling data 324, and encrypted modelling data 326, homomorphic computation module 232 may perform any of the exemplary homomorphic computations described herein to generate, for each of the first, second, and third predictive fraud models, a corresponding one of homomorphically encrypted output data 328, homomorphically encrypted output data 330, and homomorphically encrypted output data 332 indicative of a predicted likelihood that the pending or initiated transaction (e.g., as characterized by encrypted transaction data 220) represents fraudulent activity.

Each of homomorphically encrypted output data 328, 330, and 332 may, in some instances, include binary output data that characterized the predicted likelihood that the pending or initiated transaction represents fraudulent activity, e.g., a homomorphically encrypted value of zero for a predicted occurrence of non-fraudulent activity, and a homomorphically encrypted value of unity for a predicted occurrence of fraudulent activity. Further, in some instances, third computing system 302 may perform the homomorphic computations, which apply first, second, and third predictive fraud models to encrypted transaction data 220, in conjunction within one or more additional computing systems operations within environment 100, e.g., in parallel across a distributed computing system, such as, but not limited to a cloud-based network.

In some instances, homomorphic computation module 321 may package each of homomorphically encrypted output data 328, 330, and 332 into a corresponding portion of polling response 334, and may perform operations that cause third computing system 302 to transmit polling response 334 across network 120 to second computing system 202, e.g., using any appropriate communications protocol and as a response to polling request 222. In other instances, homomorphic computation module 321 may also provide each of homomorphically encrypted output data 328, 330, and 332 as an input to a verification module 336 that, when executed by the one or more processors of first computing system 102, perform any of the exemplary processes described herein to generate encoded values 338, 340, and 342 (e.g., homomorphically encrypted values), each of which represent a zero-knowledge proof of a corresponding one of homomorphically encrypted output data 328, 330, and 332.

In some instances, verification module 336 may package each of encoded values 338, 340, and 342 into corresponding portions of homomorphically encrypted proof data 344, and may perform operations that cause third computing system 302 to transmit homomorphically encrypted proof data 344 across network 120 to second computing system 202, either alone or combination with polling response 334.

In other instances, verification module 336 may perform additional operations that cause third computing system 302 to transmit homomorphically encrypted proof data 344 across network 120 to one or more peer computing systems, which may perform consensus-based operations that records homomorphically encrypted proof data 344, including encoded values 338, 340, and 342, into an additional ledger block of a distributed ledger, which may be accessible to participants in a distributed-ledger network, such as first computing system 102, second computing system 202, third computing system 302, and one or more of additional computing systems 200.

Figure 3B:
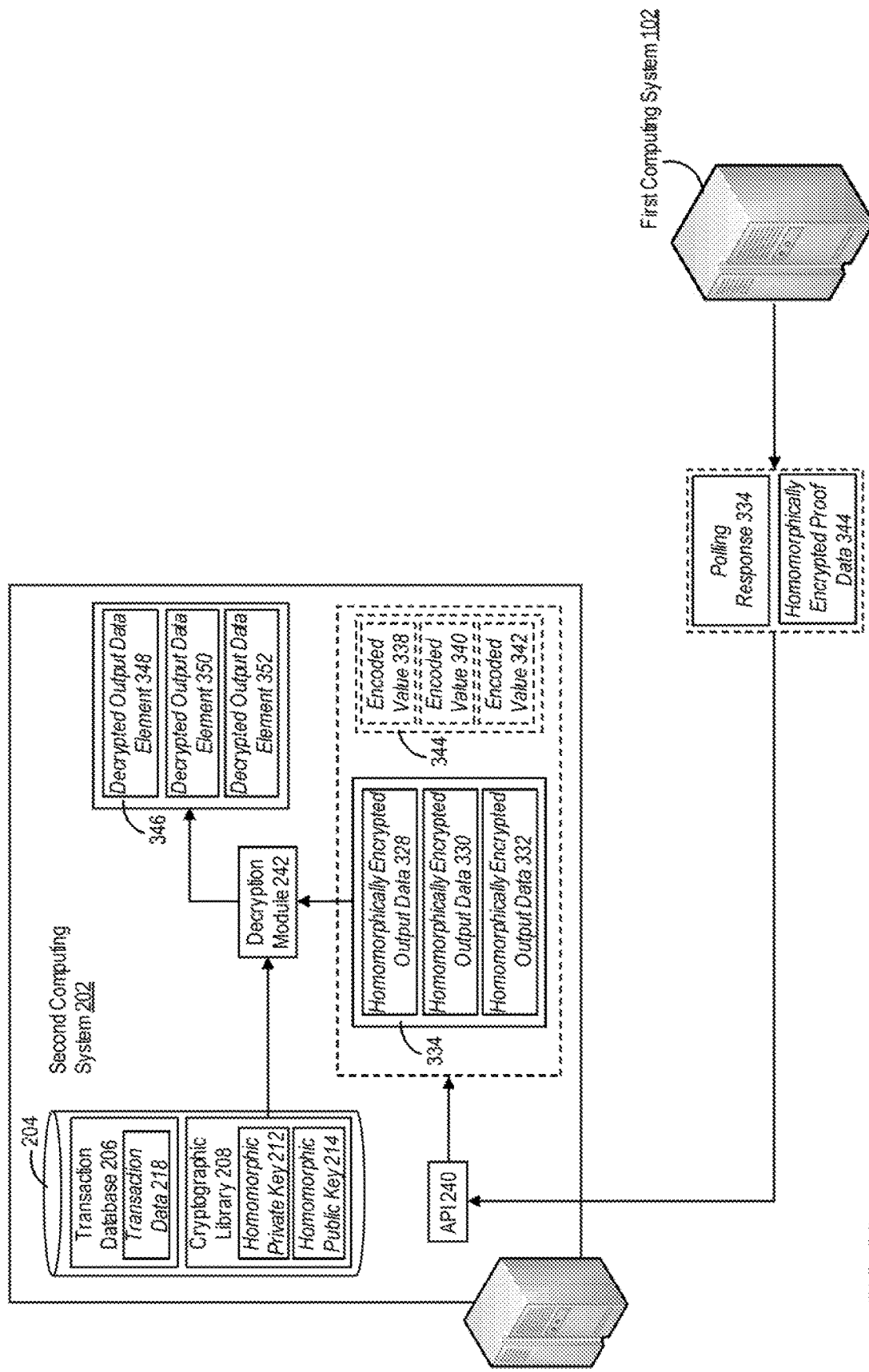

Referring to FIG. 3B, a secure programmatic interface of second computing system 202, such as API 240 may receive polling response 334, which includes homomorphically encrypted output data 328, 330, and 332. In some instances, each of homomorphically encrypted output data 328, 330, and 332 may include homomorphically encrypted binary output data characterizing the predicted likelihood that the pending or initiated transaction represents fraudulent activity, e.g., based on an application of the first, second, and third predictive models to encrypted transaction data 220. Further, API 240 may also receive homomorphically encrypted proof data that includes encoded value 338, 340, and 342 corresponding to the zero-knowledge proof described herein, e.g., alone or in combination with polling response 334.

In some instances, API 240 may route polling response 334 to decryption module 242, which may perform any of the exemplary processes described herein to decrypt each of homomorphically encrypted output data 328, 330, and 332 using homomorphic private cryptographic key 212 (e.g., as maintained within cryptographic library 208 of data repository 204), and to generate corresponding ones of model-specific elements 348, 350, and 352 of decrypted output data 346. For example, and as described herein, each of elements 348, 350, and 352 of decrypted output data 346 may include a binary integer value indicative of a likelihood that the pending or initiated transaction represents fraudulent activity, e.g., a value of unity for likely fraud, or a value of zero of no fraud, based on an application of a corresponding one of the first, second, and third predictive fraud model to encrypted transaction data 220.

Further, although not illustrated in FIG. 3B, an additional application module executed by the one or more processors of second computing system 202 may receive homomorphically encrypted proof data 238, which includes encoded values 338, 340, and 342, and perform any of the exemplary processes described herein to verify the zero-knowledge proofs represents by 338, 340, and 342, e.g., based on a computation of a verification function based on actual transaction data 218 characterizing the pending or initiated transaction and on each of encoded values 338, 340, and 342.

In other instances, also not illustrated in FIG. 3B, the additional executed application program may access a local copy of the distributed ledger (e.g., as maintained within data repository 204), and extract each of encoded values 338, 340, and 342 from the additional ledger block of the distributed ledger. Second computing system 202 may perform any of the exemplary processes described herein to verify each of the zero-knowledge proofs (e.g., which are represented by corresponding ones of encoded values 338, 340, and 342) based on the now-extracted encoded values 338, 340, and 342 and on transaction data 218.

In some exemplary embodiments, a computing system operated by a centralized authority (e.g., a governmental entity, a regulatory entity, a consortium of financial institutions, or a service provider, etc.) may receive and store discrete elements of modelling data that identify and characterize predictive fraud models privately trained by each of first computing system 102 and the subset of additional computing systems 200. The computing system of the centralized authority, e.g., third computing system 302, may apply any of the model retention and application policies described herein to each of the discrete elements of modelling data, and perform any of the exemplary processes described herein to apply each of the privately trained predictive fraud models to a received element of homomorphically encrypted transaction data associated with a particular transaction, and for each of the applied predictive fraud models, to generate an element of homomorphically encrypted output data that characterize a predicted likelihood that the particular transaction represents fraudulent activity.

In other examples, and consistent with the disclosed embodiments, the centralized authority may establish and maintain a distributed ledger having ledger blocks that immutably record discrete elements of modelling data specifying the predictive fraud models privately trained by each of first computing system 102 and the subset of additional computing systems 200, such as, but not limited to, the model coefficients, model parameters, or thresholds described herein. Further, the ledger blocks may also immutably record executable code (e.g., within "smart contract" blocks) that, when executed by one or more peer computing systems of a distributed-ledger network, implement consensus-based operations that perform any of the exemplary homomorphic computations described herein, which apply each of the predictive fraud models to homomorphically encrypted transaction data provided by second computing system 202.

As described herein, each of the peer systems may correspond to a computing system that includes one or more servers and tangible, non-transitory memory devices storing executable code and application modules. The one or more servers may each include one or more processors, which may be configured to execute portions of the stored code or application modules to perform operations consistent with the disclosed embodiments. Further, each of the peer systems may be interconnected with first computing system 102, second computing system 202, third computing system 302, and additional computing systems 200 across one or more of the communications networks described herein, such as network 120.

By way of example, each of the peer computing systems may receive, through a secure, programmatic interface, discrete elements of modelling data 122, which identifies and characterized the first predictive fraud model privately trained by first computing system 102 using any of the exemplary processes described herein. Further, each of the peer computing systems may also receive, through the secure, programmatic interface, discrete elements of modelling data 312 and modelling data 314, which identify and characterize respective ones of the second and third predictive fraud models privately trained by the subset of additional computing systems 200 using any of the exemplary processes described herein.

In some instances, and as described herein, each of modelling data 122, modelling data 312, and modelling data 314 may include scaled (or unscaled) modeled coefficients or parameters and a threshold value specifying a corresponding one of the first predictive fraud model, the second predictive fraud model, and the third predictive fraud model.

Further, one or more of modelling data 122, modelling data 312, and modelling data 314 may include counter data characterizing a number of discrete operations, e.g., homomorphic computations, required to apply corresponding ones of the first, second, and third predictive fraud models to an element of homomorphically encrypted transaction data. The counter data associated with each of the first, second, and third predictive models may be generated by corresponding ones of first computing system 102 and the subset of additional computing systems 200 through the implementation of any of the exemplary model training processes described herein.

Additionally, in some instances, one or more modelling data 122, modelling data 312, modelling data 314 may be encrypted using a public cryptographic key associated with the centralized authority. By way of example, one or more of the peer computing systems, or an additional computing system operated by the centralized authority (e.g., third computing system 302) may broadcast the public cryptographic key associated with the centralized authority to first computing system 102, the subset of additional computing systems 200, and any additional or alternate computing system that participates in the distributed-ledger network described herein.

In some examples, the peer computing systems may perform consensus-based operations that immutably record each modelling data 122, modelling data 312, modelling data 314 within one or more additional ledger blocks of the distributed ledger, and that append the one or more additional ledger blocks to a prior version of the distributed ledger to generate an updated version of the distributed ledger for among the peer computing systems and any additional or alternate computing systems associated with the distributed-ledger network. In addition to the discrete elements of modelling data 122, modelling data 312, modelling data 314, the one or more ledger blocks may also include information that identifies corresponding ones of the first, second, and third-predictive models (e.g., the model identifiers described herein) and information that identifies corresponding ones of first computing system 102 and the subset of additional computing systems 200 (e.g., an IP address, and identifier of a corresponding financial institution, etc.), along with an applied digital signature and a corresponding hash value.

In further instances, and prior to recording modelling data 122, modelling data 312, modelling data 314 within the one or more ledger blocks, the peer computing systems may perform consensus-based operations that execute certain instructions recorded onto the distributed ledger to verify a consistency of each of modelling data 122, modelling data 312, modelling data 314 with each of the model retention and application policies described herein (e.g., that ensure model robustness, etc.). For example, and as described herein, if the peer computing systems were to determine that one of the received elements of modelling data fails to comply with the applied model retention and application policies, the peer computing systems may collectively reject those elements of modelling data, and transmit an error message to the computing system that submitted the rejected elements of modelling data.

By way of example, second computing system 202 may perform any of the exemplary processes described herein to package encrypted transaction data 220 (e.g., transaction data 218 representative of the pending or initiated transaction encrypted using homomorphic public cryptographic key 214) and homomorphic public cryptographic key 214 into corresponding portions of polling request 222, and to transmit polling request 222 across network 120 to each of the peer computing systems, e.g., using any appropriate communications protocol. Each of the peer computing systems may receive polling request 222 through a secure programmatic interface, such as an application programming interface, and upon receipt of polling request, each of the peer computing system may access the updated version of the distributed ledger, which records modelling data 122, modelling data 312, and modelling data 314 within the one or more additional ledger blocks, and which also records elements of executable code within corresponding ones of the smart contract blocks (e.g., discrete application modules, etc.).

Further, and responsive to the receipt of polling request 222, each of the peer computing systems may execute the accessed code elements. In some instances, the execution of the accessed code elements may cause each of the peer computing systems to perform, through consensus-based operations, any of the exemplary homomorphic computations described herein to apply each of the first, second, and third privately trained, predictive fraud models to portions of encrypted transaction data 220, and to generate model-specific elements of homomorphically encrypted output data that, when decrypted by second computing system 202, indicates a likelihood that the particular transaction represents fraudulent activity.

By way of example, for the first predictive model, the consensus-based operations performed by the peer computing systems can include, among other things: (i) extracting modelling data 122 from a ledger block of the distributed ledger, and encrypting the corresponding model coefficients or parameters and the threshold value using the homomorphic public cryptographic key 214; (ii) perform any of the exemplary homomorphic computations described herein to apply the first predictive fraud model to encrypted transaction data 220 in accordance with the homomorphically encrypted model coefficients or model parameters; (iii) based on the homomorphically encrypted threshold value, perform any the exemplary processes described herein to generate an element of homomorphically encrypted output data indicative of a predicted likelihood that the particular transaction represents fraudulent activity; and (iv) perform any of the exemplary processes described herein to compute an encoded value that represents a zero knowledge proof for each element of the homomorphically encrypted output data and the associated homomorphic computations. Further, and responsive to the receipt of polling request 222, each of the peer computing systems may implement the exemplary consensus-based processes to apply the second predictive fraud model to encrypted transaction data 220 (e.g., based on modelling data 312) and to apply the third predictive fraud model to encrypted transaction data 220 (e.g., based on modelling data 314).

In some instances, described herein, one or more elements of modelling data 122, modelling data 312, and modelling data 314 may be encrypted using the public cryptographic key of the centralized authority. Prior to performing any of the exemplary consensus-based processes described herein, each of the peer computing systems may perform operations that access a secure, permissioned portion of the distributed ledger, extract a private cryptographic key associated with the distributed ledger, and decrypt each of the elements of modelling data 122, modelling data 312, and modelling data 314 using the private cryptographic key of the centralized authority.

Further, and as described herein, one or more of modelling data 122, modelling data 312, and modelling data 314 may include the counter data characterizing the number of discrete operations, e.g., homomorphic computations, required to apply corresponding ones of the first, second, and third predictive fraud models to encrypted transaction data 220. In some instances, the peer computing systems may perform consensus-based operations described herein to track a number of discrete homomorphic computations associated with the application of each of the first, second, and third predictive fraud models to encrypted transaction data 220, and to verify a consistency between the tracked numbers of homomorphic computations and each elements of the counter data. If, for example, one or more of the peer computing systems were to detect an inconsistency between the counter data and the tracked numbers of homomorphic computations for a corresponding one of the predictive fraud models, the peer computing systems may decline, through consensus-based operations, to generate homomorphically encrypted output data indicative of the application of that predictive fraud model to encrypted transaction data 220.

Through the implementation of the consensus-based operations, the peer computing systems may perform any of the exemplary processes described herein to package each element of the homomorphically encrypted output data (e.g., that correspond to the application of respective ones of the first, second, and third predictive models to encrypted transaction data 220) into a corresponding portion of a polling response, may be transmitted across network 120 to second computing system 202. Additionally, and through the implementation of these consensus-based operations, the peer computing systems may also package the encoded values (e.g., that represent the zero-knowledge proof for corresponding elements of the homomorphically encrypted output data) into a corresponding portion of homomorphically encrypted proof data, which may also be transmitted across network 120 to second computing system 202.

In some examples, a secure programmatic interface of second computing system 202, such as API 240 described herein, may receive the polling response, which includes each element of the homomorphically encrypted output data, and may also receive the homomorphically encrypted proof data, which includes the encoded values representative of the zero-knowledge proof for corresponding elements of the homomorphically encrypted output data. One or more application modules executed by second computing system 202 may perform any of the exemplary processes described herein to decrypt each element of the homomorphically encrypted output data (e.g., using homomorphic private cryptographic key 212), and to obtain binary output data characterizing the predicted likelihood that the pending or initiated transaction represents fraudulent activity, e.g., based on an application of corresponding ones of the first, second, and third predictive models to encrypted transaction data 220.

Second computing system 202 may also perform any of the exemplary processes described herein to determine whether the pending or initiated transaction represents fraudulent activity, e.g., based on an application of any of the ensemble-based decision protocols to the binary output data. Further, an additional application module executed by second computing system 202 may also perform any of the exemplary processes described herein to verify the zero-knowledge proofs represents by the encoded values packaged into the received homomorphically encrypted proof data, e.g., based on a computation of a verification function based on actual transaction data 218 characterizing the pending or initiated transaction and on each of the encoded values.

Figure 4:
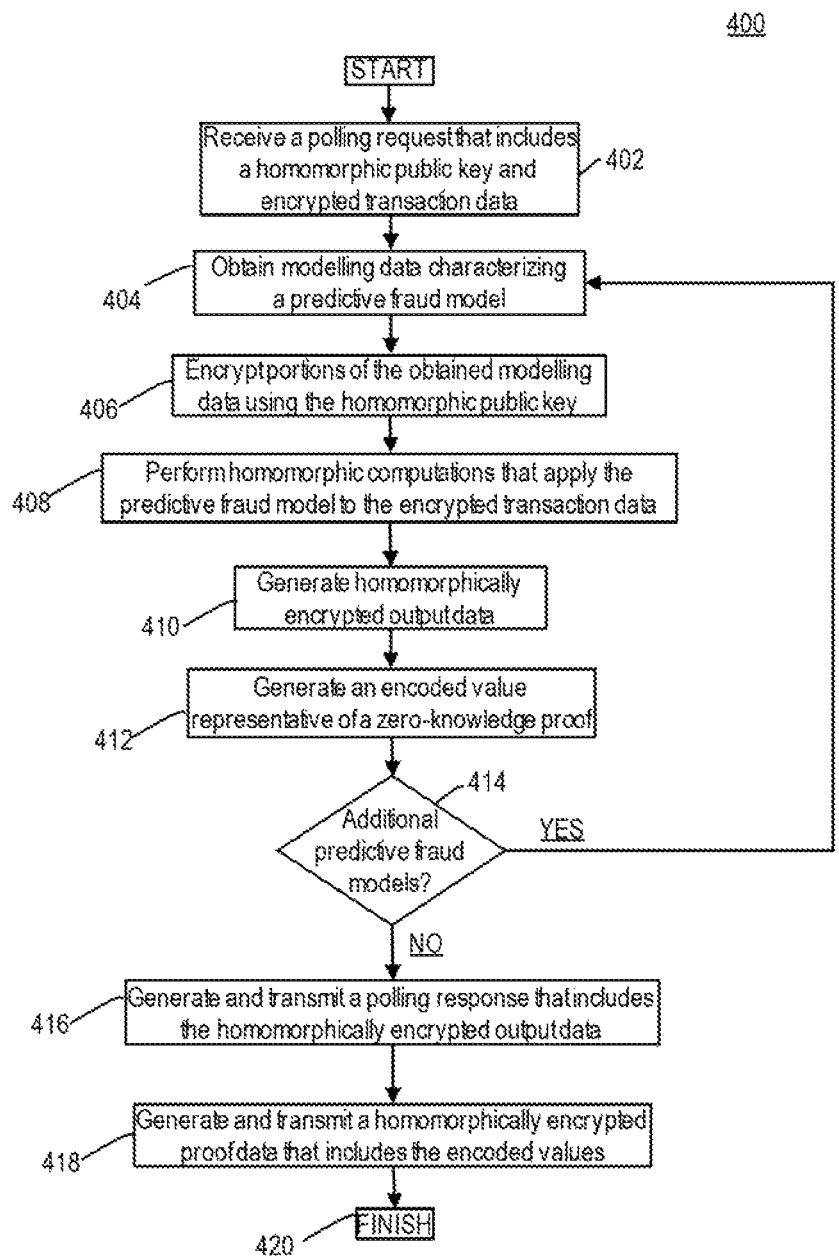
FIG. 4 is a flowchart of an exemplary process for applying a privately trained predictive model to encrypted third-party data using verifiable homomorphic computations, consistent with the disclosed embodiments.

FIG. 4 is a flowchart of an exemplary process 400 for applying a privately trained predictive model to encrypted third-party data using verifiable homomorphic computations, in accordance with some exemplary embodiments. In some examples, one or more network-connected computing systems operating within environment 100, such as, but not limited to, first computing system 102, third computing system 302, and one or more of the peer computing systems described herein, may perform one or more of the exemplary steps of process 400.

Referring to FIG. 4, first computing system 102 (or third computing system 302 and/or one or more of the peer computing systems) may obtain a homomorphic public cryptographic key and elements of homomorphically encrypted transaction data that identify and characterize a particular transaction (e.g., in step 402). For example, in step 402, first computing system 102 (or third computing system 302 and/or one or more of the peer computing systems) may receive a polling request that includes the homomorphic public cryptographic key and the elements of the homomorphically encrypted transaction data from an additional network-connected system operating within environment 100, such as second computing system 202. Further, in some instances, second computing system 202 may generate the homomorphically encrypted transaction data by encrypting one or more elements of locally maintained transaction data, which identify and characterize the pending or initiated transaction, using the homomorphic public cryptographic key.

In some instances, first computing system 102 (or third computing system 302 and/or one or more of the peer computing systems) may access modelling data that specifies a privately trained predictive model (e.g., in step 404). Examples of these privately trained predictive-fraud models include, but are not limited to, one or more regression models characterized by derived model coefficients, tuned parameters, and/or threshold values (such as, but not limited to a LASSO model or a ridge regression), one or more artificial neural network models, and one or more machine learning models (such as, but not limited to, a logistic regression model or certain decision tree models. The accessed modelling data may include adaptively trained values of model coefficients (and/or model parameters) and a threshold value that specify the privately trained predictive-fraud model, and the modelling data may be maintained within one or more tangible, non-transitory memories (e.g., within trained model data store 110 of data repository 104 of first computing system 102), or may be recorded onto one or more ledger blocks of a permissioned distributed ledger.

Further, first computing system 102 (or third computing system 302 and/or one or more of the peer computing systems) may perform any of the exemplary processes described herein to encrypt each element of the accessed modelling data using the homomorphic public cryptographic key (e.g., in step 406). By way of example, in step 406, first computing system 102 (or third computing system 302 and/or one or more of the peer computing systems) may generate homomorphically encrypted modelling data that include homomorphically encrypted values of the model coefficients (and/or the model parameters) and the threshold value that characterizes the privately trained predictive-fraud model.

Using any of the exemplary processes described herein, first computing system 102 (or third computing system 302 and/or one or more of the peer computing systems) may perform homomorphic computations that apply the privately trained predictive-fraud model to the homomorphically encrypted transaction data in accordance with the homomorphically encrypted model coefficients or model parameters (e.g., in step 408). Further, and based on homomorphically encrypted threshold value, first computing system 102 (or third computing system 302 and/or one or more of the peer computing systems) may generate homomorphically encrypted output data indicative of a predicted likelihood that the particular transaction represents fraudulent activity (e.g., in step 410).

In some instances, the homomorphically encrypted output data may include binary output data that characterized the predicted likelihood that the pending or initiated transaction represents fraudulent activity, e.g., a homomorphically encrypted value of zero for a predicted occurrence of non-fraudulent activity, and a homomorphically encrypted value of unity for a predicted occurrence of fraudulent activity. Further, first computing system 102 (or third computing system 302 and/or one or more of the peer computing systems) may perform any of the exemplary processes described herein to generate an encoded value, such as, but not limited to, a homomorphically encrypted value, that represents a zero-knowledge proof of the homomorphically encrypted output data (e.g., in step 412).

In step 414, first computing system 102 (or third computing system 302 and/or one or more of the peer computing systems) may perform additional operations that determine whether additional privately trained predictive-fraud models (and corresponding elements of modelling data) are available for application to the homomorphically encrypted transaction data. If first computing system 102 (or third computing system 302 and/or one or more of the peer computing systems) were to establish that one or more additional privately trained predictive-fraud models are available for application (e.g., step 414; YES), exemplary process 400 may pass back to step 404, and first computing system 102 (or third computing system 302 and/or one or more of the peer computing systems) may perform any of the exemplary processes described herein to access modelling data that specifies an additional one of the privately-trained predictive models.

Alternatively, if first computing system 102 (or third computing system 302 and/or one or more of the peer computing systems) were to establish that no further privately trained predictive-fraud models are available for application (e.g., step 414; NO), first computing system 102 (or third computing system 302 and/or one or more of the peer computing systems) may perform operations that package each element of the homomorphically encrypted output data into a polling response, and that transmit the polling response across network 120 to second computing system 202 (e.g., in step 416). As described herein, second computing system 202 may receive the polling response, e.g., through a secure programmatic interface, and may perform any of the exemplary processes described herein to decrypt each element of the homomorphically encrypted output data using a homomorphic private cryptographic key, and determine whether the pending or initiated transaction based on all or a portion of the decrypted output data.

Further, first computing system 102 (or third computing system 302 and/or one or more of the peer computing systems) may perform additional operations that package each of the encoded values into a corresponding portion of homomorphically encrypted proof data, and that transmit the homomorphically encrypted proof data across network 120 to second computing system 202 (e.g., in step 418). As described herein, second computing system 202 may receive the homomorphically encrypted proof data, e.g., through a secure programmatic interface, and may perform any of the exemplary processes described herein verify the zero-knowledge proof associated with each of the encoded values based on actual transaction data characterizing the pending or initiated transaction. Exemplary process 400 is then complete in step 420.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including, but not limited to, training engine 112, scaling module 121, encryption module 216, APIs 224, 240, and 316, management modules 226 and 318, local encryption modules 228 and 320, homomorphic computation module 232 and 321, verification modules 236 and 336, decryption module 242, can be implemented as one or more computer programs, i.e., one or more modules of computer program instructions encoded on a tangible nontransitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of nonvolatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network.

Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
   a communications interface;
   a memory storing instructions; and
   at least one processor coupled to the communications interface and the memory, the at least one processor being configured to execute the instructions to:
      receive encrypted information from a computing system via the communications interface, the encrypted information characterizing an exchange of data;
      perform homomorphic computations on the encrypted information, the homomorphic computations comprising applying the first predictive model to the encrypted information in accordance with at least one encrypted parameter value of the first predictive model and generating encrypted first output indicative of a predicted likelihood that the data exchange represents fraudulent activity based on the application of the first predictive model to the encrypted information in accordance with the at least one encrypted parameter value; and
      transmit the encrypted first output of the homomorphic computations to the computing system, the computing system being configured to decrypt the encrypted first output and generate decrypted output data indicative of the predicted likelihood that the data exchange represents fraudulent activity.

2. The apparatus of claim 1, wherein:
   the at least one processor is further configured to execute the instructions to encrypt first modelling data associated with the first predictive model using a homomorphic public key;
   the homomorphic computations further comprise applying the first predictive model to the encrypted information in accordance with the encrypted first modelling data; and
   the computing system is further configured to decrypt the encrypted first output data using a homomorphic private key.

3. The apparatus of claim 2, wherein the at least one processor is further configured to execute the instructions to receive the homomorphic encryption key and the encrypted information from the computing system via the communications interface.

4. The apparatus of claim 2, wherein:
   the encrypted information comprises confidential transaction data encrypted using the homomorphic public key; and
   the computing system is further configured to access the confidential transaction data that characterizes the data exchange and encrypt the confidential transaction data using the homomorphic public key.

5. The apparatus of claim 2, wherein:
   the first modelling data comprises at least one of a model coefficient, a model parameter, or a threshold value associated with the first predictive model; and
   the at least one processor is further configured to execute the instructions to encrypt the at least one of the model coefficient, the model parameter, or the threshold value using the homomorphic public key.

6. The apparatus of claim 5, wherein the homomorphic computations further comprise applying the first predictive model to the encrypted information in accordance with the at least one of the encrypted model coefficient, the encrypted model parameter, or the encrypted threshold value, the first predictive model comprises a machine learning model or an artificial neural network model.

7. The apparatus of claim 2, wherein:
   the homomorphic public key and the homomorphic private key are consistent with a homomorphic encryption scheme, the homomorphic encryption scheme supporting verifiable computations on integer ciphertext; and the first modelling data comprises at least one of a scaled model coefficient, a scaled model parameter, or a scaled threshold value that are consistent with the verifiable computations on the integer ciphertext.

8. The apparatus of claim 2, wherein the at least one processor is further configured to:

obtain second modelling data associated with a second predictive model and encrypt the second modelling data using the homomorphic public key;

perform additional homomorphic computations on the encrypted information, the additional homomorphic computations applying the second predictive model to the encrypted information in accordance with the encrypted second modelling data; and transmit, via the communications interface, the encrypted first output and an encrypted second output of the additional homomorphic computations to the computing system, the computing system being configured to decrypt the encrypted first and second outputs using the homomorphic private key.

9. The apparatus of claim 2, wherein the at least one processor is further configured to execute the instructions to:

access one or more ledger blocks of a distributed ledger, the distributed ledger being maintained within the memory; and extract at least a portion of the first modelling data from the one or more ledger blocks of the distributed ledger.

10. The apparatus of claim 1, wherein the at least one processor is further configured to execute the instructions to:

based on the encrypted first output, generate an encoded value representative of a zero-knowledge proof, the zero-knowledge proof confirming an accuracy of the homomorphic computations performed on the encrypted information; and transmit the encoded value to the computing system via the communications interface, the computing system being configured to verify the zero-knowledge proof based on decrypted output data characterizing the data exchange.

11. The apparatus of claim 1, wherein the at least one processor is further configured to execute the instructions to transmit the encoded value to an additional computing system via the communications interface, the additional computing system being configured to perform operations that record the encoded value within a ledger block of a distributed ledger.

12. The apparatus of claim 1, wherein the decrypted output data comprises binary output data indicative of the predicted likelihood that the data exchange represents fraudulent activity.

13. A computer-implemented method, comprising:

receiving, using at least one processor, encrypted information from a computing system, the encrypted information characterizing an exchange of data;

performing, using the at least one processor, homomorphic computations on the encrypted information, the homomorphic computations comprising applying the first predictive model to the encrypted information in accordance with at least one encrypted parameter value of the first predictive model and generating encrypted first output indicative of a predicted likelihood that the data exchange represents fraudulent activity based on the application of the first predictive model to the encrypted information in accordance with the at least one encrypted parameter value; and transmitting, using the at least one processor, the encrypted first output of the homomorphic computations to the computing system, the computing system being configured to decrypt the encrypted first output and generate decrypted output data indicative of the predicted likelihood that the data exchange represents fraudulent activity.

14. The computer-implemented method of claim 13, wherein:

the computer-implemented method further comprises encrypting, using the at least one processor, first modelling data associated with the first predictive model using a homomorphic public key;

the homomorphic computations further comprise applying the first predictive model to the encrypted information in accordance with the encrypted first modelling data; and the computing system is further configured to decrypt the encrypted first output data using a homomorphic private key.

15. The computer-implemented method of claim 14, wherein the receiving comprises receiving the homomorphic encryption key and the encrypted information from the computing system.

16. The computer-implemented method of claim 14, wherein:

the first modelling data comprises at least one of a model coefficient, a model parameter, or a threshold value associated with the first predictive model; and the encrypting further comprises encrypting the at least one of the model coefficient, the model parameter, or the threshold value using the homomorphic public key; and the homomorphic computations further comprise applying the first predictive model to the encrypted information in accordance with the at least one of the encrypted model coefficient, the encrypted model parameter, or the encrypted threshold value.

17. The computer-implemented method of claim 14, wherein:

the homomorphic public key and the homomorphic private key are consistent with a homomorphic encryption scheme, the homomorphic encryption scheme supporting verifiable computations on integer ciphertext; and the first modelling data comprises at least one of a scaled model coefficient, a scaled model parameter, or a scaled threshold value that are consistent with the verifiable computations on the integer ciphertext.

18. The computer-implemented method of claim 14, further comprising:

accessing, using the at least one processor, one or more ledger blocks of a distributed ledger, the distributed ledger being maintained within a memory; and extracting, using the at least one processor, at least a portion of the first modelling data from the one or more ledger blocks of the distributed ledger.

19. The computer-implemented method of claim 13, further comprising:

based on the encrypted first output, generating, using the at least one processor, an encoded value representative of a zero-knowledge proof, the zero-knowledge proof confirming an accuracy of the homomorphic computations performed on the encrypted information; and transmitting, using the at least one processor, the encoded value to the computing system, the computing system being configured to verify the zero-knowledge proof based on decrypted output data characterizing the data exchange.

20. A tangible, non-transitory computer-readable medium storing instructions that, when executed by at least one processor, cause the at least one processor to perform a method, comprising:
- receiving encrypted information from a computing system, the encrypted information characterizing an exchange of data;
- performing homomorphic computations on the encrypted information, the homomorphic computations comprising applying the first predictive model to the encrypted information in accordance with at least one encrypted parameter value of the first predictive model and generating encrypted first output indicative of a predicted likelihood that the data exchange represents fraudulent activity based on the application of the first predictive model to the encrypted information in accordance with the at least one encrypted parameter value; and
- transmitting the encrypted first output of the homomorphic computations to the computing system, the computing system being configured to decrypt the encrypted first output and generate decrypted output data indicative of the predicted likelihood that the data exchange represents fraudulent activity.

21. The apparatus of claim 1, wherein:
- the at least one processor is further configured to execute the instructions to encrypt the at least one parameter value of the first predictive model using a homomorphic public key; and
- the computing system is further configured to decrypt the encrypted first output data using a homomorphic private key.

* * * * *